United States Patent
Maruyama et al.

(10) Patent No.: US 11,860,338 B2
(45) Date of Patent: Jan. 2, 2024

(54) OPTICAL FILM

(71) Applicant: FUJIFILM Corporation, Tokyo (JP)

(72) Inventors: Akira Maruyama, Kanagawa (JP);
Keisuke Kodama, Kanagawa (JP);
Tetsuro Otsuka, Kanagawa (JP);
Hiroyuki Hagio, Kanagawa (JP); Yuta Takahashi, Kanagawa (JP); Shinpei Yoshida, Kanagawa (JP); Satoshi Yanokuchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 164 days.

(21) Appl. No.: 17/670,921

(22) Filed: Feb. 14, 2022

(65) Prior Publication Data

US 2022/0171096 A1 Jun. 2, 2022

Related U.S. Application Data

(63) Continuation of application No. PCT/JP2020/030863, filed on Aug. 14, 2020.

(30) Foreign Application Priority Data

Aug. 16, 2019 (JP) ................................ 2019-149419
Sep. 26, 2019 (JP) ................................ 2019-175987
(Continued)

(51) Int. Cl.
*G02B 1/11* (2015.01)
*G02F 1/137* (2006.01)
(Continued)

(52) U.S. Cl.
CPC ............... *G02B 1/11* (2013.01); *C09K 19/04* (2013.01); *G02F 1/13706* (2021.01);
(Continued)

(58) Field of Classification Search
CPC ... G02B 1/11; G02F 1/13712; G02F 1/13706; G02F 1/133711; G02F 2202/022; C09K 19/04; C09K 2019/0448; H01J 49/40
(Continued)

(56) References Cited

U.S. PATENT DOCUMENTS

2008/0044596 A1* 2/2008 Fukagawa .......... B29D 11/0073
428/1.2
2019/0004225 A1* 1/2019 Iijima .................. G02B 5/3016
(Continued)

FOREIGN PATENT DOCUMENTS

JP 2011-028026 A 2/2011
JP 2011028026 A * 2/2011
(Continued)

OTHER PUBLICATIONS

International Search Report issued in PCT/JP2020/030863 dated Oct. 27, 2020.
(Continued)

*Primary Examiner* — Edward J Glick
*Assistant Examiner* — William D Peterson
(74) *Attorney, Agent, or Firm* — Edward Neils LLC; Jean C. Edwards, Esq.

(57) ABSTRACT

Provided is an optical film with a resin substrate adhered to an optically anisotropic layer and suppression of occurrence of optical defects in the optically anisotropic layer. The optical film has a resin substrate having an alignment regulating force and an optically anisotropic layer arranged thereon, in which the optically anisotropic layer contains a liquid crystal compound and a compound having a heteroatom different from the liquid crystal compound, and in a case where a surface of the optical film on an optically anisotropic layer side thereof is a first surface and a surface of the optical film on a resin substrate side thereof is a second
(Continued)

surface, and components of the optical film in a depth direction are analyzed by time-of-flight secondary ion mass spectrometry while irradiating the optical film with an ion beam from the first surface toward the second surface, the obtained profile satisfies a predetermined requirement.

20 Claims, 4 Drawing Sheets

(30) Foreign Application Priority Data

| | | |
|---|---|---|
| Sep. 27, 2019 | (JP) | 2019-177831 |
| Jun. 1, 2020 | (JP) | 2020-095459 |
| Jun. 22, 2020 | (JP) | 2020-107171 |
| Aug. 4, 2020 | (JP) | 2020-132353 |

(51) Int. Cl.
  *C09K 19/04* (2006.01)
  *G02F 1/1337* (2006.01)
  *H01J 49/40* (2006.01)

(52) U.S. Cl.
  CPC .... *G02F 1/13712* (2021.01); *G02F 1/133711* (2013.01); *H01J 49/40* (2013.01); *C09K 2019/0448* (2013.01); *G02F 2202/022* (2013.01)

(58) Field of Classification Search
  USPC .......................................................... 349/170
  See application file for complete search history.

(56) References Cited

U.S. PATENT DOCUMENTS

| | | |
|---|---|---|
| 2019/0218460 A1 | 7/2019 | Suzuki et al. |
| 2020/0109333 A1 | 4/2020 | Akutagawa et al. |

FOREIGN PATENT DOCUMENTS

| | | |
|---|---|---|
| JP | 2014-182217 A | 9/2014 |
| JP | 2020-042149 A | 3/2020 |
| WO | 2017/164004 A1 | 9/2017 |
| WO | 2018/062068 A1 | 4/2018 |
| WO | 2019/009255 A1 | 1/2019 |

OTHER PUBLICATIONS

Written Opinion issued in PCT/JP2020/030863 dated Oct. 27, 2020.
International Preliminary Report on Patentability completed by WIPO dated Feb. 17, 2022 in connection with International Patent Application No. PCT/JP2020/030863.
Office Action, issued by the Japanese Patent Office dated Feb. 21, 2023, in connection with Japanese Patent Application No. 2021-540759.

* cited by examiner

OPTICAL FILM

CROSS-REFERENCE TO RELATED APPLICATIONS

This application is a Continuation of PCT International Application No. PCT/JP2020/030863 filed on Aug. 14, 2020, which was published under PCT Article 21(2) in Japanese, and which claims priority under 35 U.S.C. § 119(a) to Japanese Patent Application No. 2019-149419 filed on Aug. 16, 2019, Japanese Patent Application No. 2019-175987 filed on Sep. 26, 2019, Japanese Patent Application No. 2019-177831 filed on Sep. 27, 2019, Japanese Patent Application No. 2020-095459 filed on Jun. 1, 2020, Japanese Patent Application No. 2020-107171 filed on Jun. 22, 2020 and Japanese Patent Application No. 2020-132353 filed on Aug. 4, 2020. The above applications are hereby expressly incorporated by reference, in their entirety, into the present application.

BACKGROUND OF THE INVENTION

1. Field of the Invention

The present invention relates to an optical film.

2. Description of the Related Art

An optically anisotropic layer having refractive index anisotropy is applied to various applications such as an antireflection film of a display device and an optical compensation film of a liquid crystal display device.

JP2014-182217A discloses a method of subjecting a resin substrate to a rubbing treatment and applying a composition containing a liquid crystal compound on the surface of the resin substrate to form an optically anisotropic layer, as a method for forming an optically anisotropic layer.

SUMMARY OF THE INVENTION

On the other hand, in recent years, further improvement in adhesiveness between the resin substrate and the optically anisotropic layer has been required. According to the studies by the present inventors, it has been found that adhesiveness between the resin substrate and the optically anisotropic layer is not sufficient and further improvement in the adhesiveness is required, in the aspect disclosed in JP2014-182217A.

In addition, it is also desired that the occurrence of optical defects due to poor alignment of the liquid crystal compound is suppressed in the formed optically anisotropic layer.

In view of the above circumstances, an object of the present invention is to provide an optical film with excellent adhesiveness between a resin substrate and an optically anisotropic layer and suppression of occurrence of optical defects in the optically anisotropic layer.

As a result of extensive studies on the problems of the related art, the present inventors have found that the foregoing object can be achieved by the following configurations.

(1) An optical film having a resin substrate having an alignment regulating force and an optically anisotropic layer arranged on the resin substrate, in which the optically anisotropic layer contains a liquid crystal compound and a compound having a heteroatom different from the liquid crystal compound, and in a case where a surface of the optical film on an optically anisotropic layer side thereof is defined as a first surface and a surface of the optical film on a resin substrate side thereof is defined as a second surface, and components of the optical film in a depth direction are analyzed by time-of-flight secondary ion mass spectrometry while irradiating the optical film with an ion beam from the first surface toward the second surface, the optical film satisfies both a requirement 1 and a requirement 2 which will be described later.

(2) The optical film according to (1), in which the compound having a heteroatom has at least one selected from the group consisting of a urethane group, an ester group, an amide group, and a boronic acid group.

(3) The optical film according to (1) or (2), in which the optically anisotropic layer is
a layer formed of a composition containing a liquid crystal compound having a polymerizable group and
a polymerizable compound having a heteroatom and having a polymerizable group, which is different from the liquid crystal compound having a polymerizable group.

(4) The optical film according to (3), in which the polymerizable compound having a heteroatom and having a polymerizable group is a polymer that contains a repeating unit having a polymerizable group and has a heteroatom.

(5) The optical film according to any one of (1) to (4), in which the maximum value Imax and an average value Iave satisfy a relationship of Expression (A) in a case where an average intensity of a secondary ion intensity derived from the compound having a heteroatom from the first surface to the A position is defined as the average value Iave.

$$1.3 \leq Imax/Iave \qquad \text{Expression (A)}$$

(6) The optical film according to (5), in which the Imax/Iave is 50 or more.

(7) The optical film according to any one of (1) to (6), in which a distance between the C position and the D position is 50 nm or less.

(8) The optical film according to any one of (1) to (7), in which the resin substrate contains cellulose acylate.

According to an aspect of the present invention, it is possible to provide an optical film with excellent adhesiveness between a resin substrate and an optically anisotropic layer and suppression of occurrence of optical defects in the optically anisotropic layer.

DESCRIPTION OF THE PREFERRED EMBODIMENTS

Figure 1:
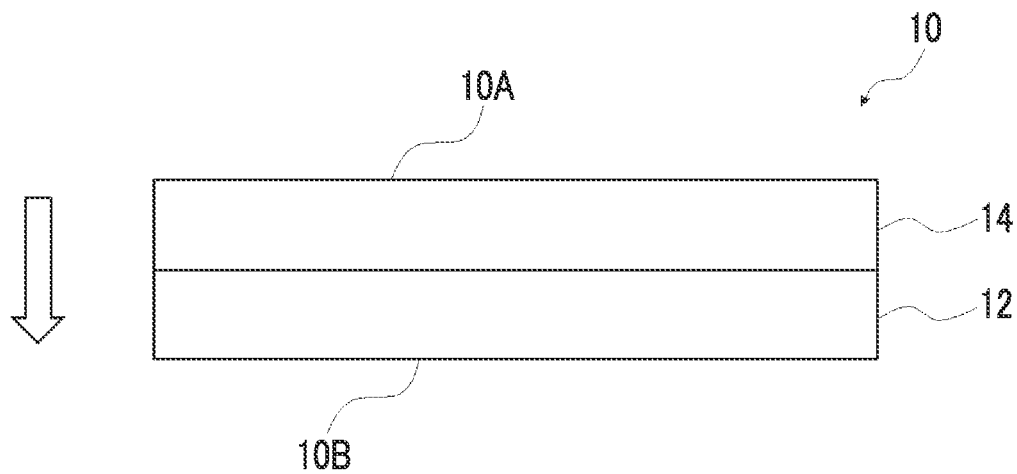
FIG. 1 is a schematic diagram showing an example of an optical film.

Hereinafter, the present invention will be described in more detail. Any numerical range expressed using "to" in the present specification refers to a range including the numerical values before and after the "to" as a lower limit value and an upper limit value, respectively. First, the terms used in the present specification will be described.

The term "light" in the present specification means an actinic ray or radiation, for example, an emission line spectrum of a mercury lamp, a far ultraviolet ray typified by an excimer laser, an extreme ultraviolet ray (EUV light), an X-ray, an ultraviolet ray, or an electron beam (EB). Of these, an ultraviolet ray is preferable.

The term "visible light" in the present specification refers to light in a wavelength range of 380 to 780 nm. In addition, the measurement wavelength in the present specification is 550 nm unless otherwise specified.

In the present specification, in a case where the liquid crystal compound is twist-aligned in the optically anisotropic layer, the twisted angle is preferably more than 0° and less than 360°.

In the present specification, "(meth)acrylic" is a general term for acrylic and methacrylic, and "(meth)acrylate" is a general term for acrylate and methacrylate.

In the present invention, Re (λ) and Rth (λ) represent an in-plane retardation and a thickness direction retardation at a wavelength λ, respectively. Unless otherwise specified, the wavelength λ is 550 nm.

In the present invention, Re (λ) and Rth (λ) are values measured at a wavelength λ in AxoScan (manufactured by Axometrics, Inc.). By inputting an average refractive index ((nx+ny+nz)/3) and a film thickness (d (μm)) in AxoScan, slow axis direction (°)
Re (λ)=R0 (λ)
Rth (λ)=((nx+ny)/2−nz)×d
are calculated.

Although R0 (λ) is displayed as a numerical value calculated by AxoScan, it means Re (λ).

In the present specification, the refractive indexes nx, ny, and nz are measured using an Abbe refractometer (NAR-4T, manufactured by Atago Co., Ltd.) and using a sodium lamp (λ=589 nm) as a light source. In addition, in a case of measuring the wavelength dependence, it can be measured with a multi-wavelength Abbe refractometer DR-M2 (manufactured by Atago Co., Ltd.) in combination with an interference filter.

In addition, the values in Polymer Handbook (John Wiley & Sons, Inc.) and catalogs of various optical films can be used. The values of the average refractive index of main optical films are illustrated below: cellulose acylate (1.48), cycloolefin polymer (1.52), polycarbonate (1.59), polymethylmethacrylate (1.49), and polystyrene (1.59).

A feature point of the optical film according to embodiment of the present invention is that a compound having a heteroatom (hereinafter, also simply referred to as "specific compound") which will be described later is distributed at a predetermined depth position in the depth direction of the optical film.

A requirement 1 which will be described later means that the specific compound is unevenly distributed on the resin substrate side in the optically anisotropic layer, and satisfying the requirement 1 leads to improved adhesiveness between the resin substrate and the optically anisotropic layer.

A requirement 2 which will be described later represents an uneven distribution amount of the specific compound, and satisfying the requirement 2 ensures the aligning properties of the liquid crystal compound, resulting in suppression of occurrence of optical defects.

Hereinafter, an embodiment of the optical film will be described with reference to the accompanying drawings.

FIG. 1 is a schematic diagram showing an example of an optical film. An optical film 10 has a resin substrate 12 and an optically anisotropic layer 14 in this order. As shown in FIG. 1, the resin substrate 12 and the optically anisotropic layer 14 are in direct contact with each other.

Hereinafter, individual members constituting the optical film will be described in detail.

<Resin Substrate>

The optical film has a resin substrate.

The resin substrate has an alignment regulating force. The fact that the resin substrate has an alignment regulating force means that the resin substrate has a force to align a liquid crystal compound in a case where the liquid crystal compound is arranged on the surface of the resin substrate. That is, the resin substrate has an alignment regulating force for the liquid crystal compound.

Examples of the resin substrate having an alignment regulating force include a resin substrate that has been subjected to a rubbing treatment and a resin substrate that has been subjected to a stretching treatment, among which a resin substrate that has been subjected to a rubbing treatment is preferable.

The direction of the rubbing treatment is not particularly limited, and an optimum direction is appropriately selected according to the direction in which the liquid crystal compound is desired to be aligned.

A treatment method widely adopted as a liquid crystal alignment treatment step of a liquid crystal display (LCD) can be applied for the rubbing treatment. That is, a method of obtaining alignment by rubbing the surface of the resin substrate in a certain direction with paper, gauze, felt, rubber, nylon fiber, polyester fiber, or the like can be used.

The resin substrate is preferably a transparent substrate. The transparent substrate is intended to refer to a substrate having a visible light transmittance of 60% or more, which preferably has a visible light transmittance of 80% or more and more preferably 90% or more.

A polymer having excellent optical performance transparency, mechanical strength, heat stability, moisture shielding property, isotropy, and the like is preferable as the resin constituting the resin substrate.

Examples of the resin substrate include a cellulose acylate film (for example, a cellulose triacetate film (refractive index: 1.48), a cellulose diacetate film, a cellulose acetate butyrate film, or a cellulose acetate propionate film), a polyolefin film (for example, a polyethylene film or a polypropylene film), a polyester film (for example, a polyethylene terephthalate film or a polyethylene naphthalate film), a polyacrylic film (for example, polymethylmethacrylate), a polyethersulfone film, a polyurethane film, a polycarbonate film, a polysulfone film, a polyether film, a polymethylpentene film, a polyether ketone film, a (meth) acrylic nitrile film, and a film of a polymer having an alicyclic structure (a norbornene-based resin (ARTON: trade name, manufactured by JSR Corporation), or an amorphous polyolefin (ZEONEX: trade name, manufactured by Zeon Corporation)).

Above all, the resin constituting the resin substrate is preferably cellulose acylate, poly(meth)acrylate, a polymer having an alicyclic structure, polystyrene, or polycarbonate and more preferably cellulose acylate, from the viewpoint that at least one effect of more excellent adhesiveness between the resin substrate and the optically anisotropic layer or further suppression of the occurrence of optical defects in the optically anisotropic layer can be obtained (hereinafter, it is also simply referred to as "the viewpoint that the effect of the present invention is more excellent").

The resin substrate may contain various additives (for example, an optical anisotropy adjuster, a wavelength dispersion adjuster, a fine particle, a plasticizer, an ultraviolet inhibitor, a deterioration inhibitor, and a release agent).

The in-plane retardation of the resin substrate at a wavelength of 550 nm is not particularly limited, and is preferably 10 nm or less from the viewpoint of more easily exhibiting the optical properties of the optically anisotropic layer. The lower limit thereof is not particularly limited, and may be, for example, zero.

The solubility parameter (SP) value of the resin substrate is not particularly limited, and is preferably 19.0 to 25.0 MPa$^{1/2}$ and more preferably 20.0 to 23.0 MPa$^{1/2}$.

The SP value of the resin substrate corresponds to the SP value of the resin constituting the resin substrate.

In the present specification, the SP value is intended to mean a non-dispersive force component δa of an SP value calculated by the method of Hoy et al. (See "PROPERTIES OF POLYMERS (ED.3)" by VAN KREVELEN, D. W., published from ELSEVIER (1990)).

That is, the δa value can be calculated by Expression (X) using three-dimensional SP values (δd, δp, and δh) calculated by the method of Hoy et al.

$$\delta a = (\delta p^2 + \delta h^2)^{0.5} \qquad \text{Expression (X)}$$

According to the method of Hoy et al., individual values of δd, δp, and δh can be calculated from the chemical structural formula of a compound to be obtained.

In a case of a copolymer consisting of a plurality of repeating units, the δa value of the copolymer can be obtained by substituting square values of three-dimensional SP values, (δd$^2$, δp$^2$, and δh$^2$) of the copolymer, which are respectively the sum of the product of a square value (δd$^2$, δp$^2$, and δh$^2$) of a three-dimensional SP value of each repeating unit and a volume ratio of each repeating unit, in Expression (X).

The thickness of the resin substrate is not particularly limited, and is preferably 10 to 200 μm, more preferably 10 to 100 μm, and still more preferably 20 to 90 sm.

<Optically Anisotropic Layer>

(Liquid Crystal Compound)

The optically anisotropic layer contains a liquid crystal compound.

The type of the liquid crystal compound is not particularly limited, and examples thereof include known liquid crystal compounds.

The liquid crystal compound may be a low-molecular weight compound or a high-molecular weight compound. The low-molecular weight compound means a compound having a molecular weight of 1,000 or less, and the high-molecular weight compound means a compound having a molecular weight of more than 1,000.

The liquid crystal compound contained in the optically anisotropic layer is preferably a high-molecular weight compound.

The content of the liquid crystal compound in the optically anisotropic layer is not particularly limited, and is preferably 50% by mass or more and more preferably 70% by mass or more with respect to the total mass of the optically anisotropic layer, from the viewpoint that the effect of the present invention is more excellent. The upper limit thereof is not particularly limited, and is often 90% by mass or less.

From the viewpoint that the effect of the present invention is more excellent, the optically anisotropic layer is preferably formed of a composition containing a liquid crystal compound having a polymerizable group (hereinafter, also referred to as "polymerizable liquid crystal compound"). In other words, the liquid crystal compound contained in the optically anisotropic layer is preferably a polymer obtained by polymerizing a polymerizable liquid crystal compound.

The type of the polymerizable liquid crystal compound is not particularly limited. Generally, the liquid crystal compound can be classified into a rod-like type (rod-like liquid crystal compound) and a disk-like type (discotic liquid crystal compound) depending on the shape thereof. Further, the liquid crystal compound can be classified into a low molecular weight type and a high molecular weight type. The high molecular weight generally refers to having a polymerization degree of 100 or more (Polymer Physics-Phase Transition Dynamics, Masao Doi, p. 2, Iwanami Shoten Publishers, 1992). Any liquid crystal compound can be used in the present invention, and it is preferable to use a polymerizable rod-like liquid crystal compound or a polymerizable disk-liked liquid crystal compound and it is more preferable to use a polymerizable rod-like liquid crystal compound. Two or more polymerizable rod-like liquid crystal compounds, two or more polymerizable disk-like liquid crystal compounds, or a mixture of a polymerizable rod-like liquid crystal compound and a polymerizable disk-like liquid crystal compound may be used.

For example, polymerizable rod-like liquid crystal compounds described in claim 1 of JP1999-513019A (JP-H11-513019A) or paragraphs [0026] to [0098] of JP2005-289980A can be preferably used as the polymerizable rod-like liquid crystal compound.

For example, polymerizable disk-like liquid crystal compounds described in paragraphs [0020] to [0067] of JP2007-108732A or paragraphs [0013] to [0108] of JP2010-244038A can be preferably used as the polymerizable disk-like liquid crystal compound.

The type of the polymerizable group contained in the polymerizable liquid crystal compound is not particularly limited, and is preferably a functional group capable of an addition polymerization reaction, more preferably a polymerizable ethylenic unsaturated group or a ring-polymerizable group, and still more preferably an acryloyl group, a methacryloyl group, a vinyl group, or a styryl group.

(Compound Having Heteroatom)

The optically anisotropic layer contains a compound having a heteroatom (specific compound), which is different from the liquid crystal compound described above. As will be described later, the specific compound is distributed at a predetermined position in the optical film.

The specific compound has a heteroatom. In a case where the specific compound has a heteroatom, the adhesiveness between the substrate and the optically anisotropic layer is improved. The heteroatom is preferably an oxygen atom, a nitrogen atom, a sulfur atom, or a boron atom from the viewpoint that the effect of the present invention is more excellent.

The specific compound preferably has at least one selected from the group consisting of a urethane group, an ester group, an amide group, and a boronic acid group from the viewpoint that the effect of the present invention is more excellent.

The specific compound may be a low-molecular weight compound or a high-molecular weight compound. The low-molecular weight compound means a compound having a molecular weight of 1,000 or less, and the high-molecular weight compound means a compound having a molecular weight of more than 1,000.

The specific compound contained in the optically anisotropic layer is preferably a high-molecular weight compound.

The content of the specific compound in the optically anisotropic layer is not particularly limited, and is preferably 10% by mass or less, more preferably 5% by mass or less, and still more preferably 2% by mass or less with respect to the total mass of the optically anisotropic layer, from the viewpoint that the effect of the present invention is more excellent. The lower limit thereof is not particularly limited, and is preferably 0.1% by mass or more and more preferably 0.3% by mass or more.

From the viewpoint that the effect of the present invention is more excellent, the optically anisotropic layer is preferably formed of a composition containing a polymerizable compound having a heteroatom and having a polymerizable group. In other words, the specific compound contained in the optically anisotropic layer is preferably a polymer obtained by polymerizing a polymerizable compound having a heteroatom and having a polymerizable group (hereinafter, also referred to as "specific polymerizable compound").

The specific polymerizable compound has a heteroatom. The heteroatom is preferably an oxygen atom, a nitrogen atom, a sulfur atom, or a boron atom from the viewpoint that the effect of the present invention is more excellent.

The specific polymerizable compound preferably has at least one selected from the group consisting of a urethane group, an ester group, an amide group, and a boronic acid group (—B(OH)$_2$) from the viewpoint that the effect of the present invention is more excellent.

From the viewpoint that the adhesiveness between the resin substrate and the optically anisotropic layer is more excellent, the specific polymerizable compound is preferably a polymer that contains a repeating unit having a polymerizable group (hereinafter, also referred to as "unit 1") and has a heteroatom (hereinafter, also simply referred to as "specific polymerizable polymer").

The type of heteroatom contained in the specific polymerizable polymer is as described above.

The specific polymerizable polymer preferably has at least one selected from the group consisting of a urethane group, an ester group, an amide group, and a boronic acid group from the viewpoint that the effect of the present invention is more excellent.

As will be described later, the specific polymerizable polymer may have a heteroatom in the unit 1.

The type of the polymerizable group contained in the unit 1 is not particularly limited, and is preferably a functional group capable of an addition polymerization reaction, more preferably a polymerizable ethylenic unsaturated group or a ring-polymerizable group, and still more preferably an acryloyl group, a methacryloyl group, a vinyl group, or a styryl group.

The structure of a main chain of unit 1 is not particularly limited, and may be, for example, a known structure, which is preferably, for example, a skeleton selected from the group consisting of a (meth)acrylic skeleton, a styrene-based skeleton, a siloxane-based skeleton, a cycloolefin-based skeleton, a methylpentene-based skeleton, an amide-based skeleton, and an aromatic ester-based skeleton.

Of these, a skeleton selected from the group consisting of a (meth)acrylic skeleton, a siloxane-based skeleton, and a cycloolefin-based skeleton is more preferable, and a (meth)acrylic skeleton is still more preferable.

The unit 1 is preferably a repeating unit represented by Formula (1), from the viewpoint that the effect of the present invention is more excellent.

(1)

$R^1$ represents a hydrogen atom or an alkyl group having 1 to 4 carbon atoms.

$L^1$ represents a single bond or an n+1-valent linking group. For example, in a case where n is 1, $L^1$ represents a divalent linking group, and in a case where n is 2, $L^1$ represents a trivalent linking group. In a case where $L^1$ is a single bond, n represents 1.

Examples of the divalent linking group include a divalent aliphatic hydrocarbon group (for example, an alkylene group) which may have a substituent, an arylene group which may have a substituent, a heteroarylene which may have a substituent, —O—, —CO—, —NH—, and a group in which two or more thereof are combined. Examples of the group in which two or more thereof are combined include —CO—O—, —CO—NH—, —O—CO—NH—, —CO—O-divalent aliphatic hydrocarbon group which may have a substituent-, —CO—NH-divalent aliphatic hydrocarbon group which may have a substituent-, —NH-divalent aliphatic hydrocarbon group which may have a substituent-, —CO—O-divalent aliphatic hydrocarbon group which may have a substituent-arylene group which may have a substituent-, —CO—O-divalent aliphatic hydrocarbon group which may have a substituent-O—, —CO—O-divalent aliphatic hydrocarbon group which may have a substituent-NH—, —CO—O-divalent aliphatic hydrocarbon group which may have a substituent-O—CO—NH—, and —CO—O-divalent aliphatic hydrocarbon group which may have a substituent-O—CO—NH-divalent aliphatic hydrocarbon group which may have a substituent-O—.

Examples of the trivalent linking group include a trivalent aliphatic hydrocarbon group which may have a substituent, a trivalent aromatic group which may have a substituent, a nitrogen atom (>N—), and a group in which these groups and the above-mentioned divalent linking group are combined.

Above all, $L^1$ is preferably an n+1-valent linking group containing a heteroatom, more preferably a divalent linking group containing a heteroatom or a trivalent linking group containing a heteroatom, and still more preferably a divalent linking group containing at least one selected from the group consisting of a urethane group, an ester group, and an amide group.

The divalent linking group containing at least one selected from the group consisting of a urethane group, an ester group, and an amide group is preferably a group in which at least one selected from the group consisting of a urethane group, an ester group, and an amide group and an aliphatic hydrocarbon group are combined, examples of which include groups exemplified in "a group in which two or more thereof are combined" described in the above-mentioned divalent linking group.

$P^1$ represents a polymerizable group. The definition of the polymerizable group is as described above.

n represents an integer of 1 or more. Above all, n is preferably 1 or 2 and more preferably 1 from the viewpoint that the effect of the present invention is more excellent.

The content of unit 1 in the specific polymerizable polymer is not particularly limited, and is preferably 20% by mass or more, more preferably 50% by mass or more, and still more preferably 70% by mass or more with respect to all the repeating units of the specific polymerizable polymer, from the viewpoint that the effect of the present invention is more excellent. The upper limit thereof is not particularly limited, and may be, for example, 100% by mass and is often 95% by mass or less.

Examples of the unit 1 include repeating units shown in Table 1 below.

TABLE I

| No. | Structure |
|---|---|
| A1 | 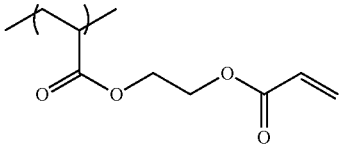 |
| A2 | 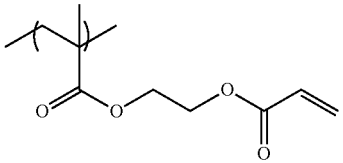 |
| A3 | 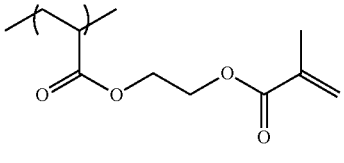 |
| A4 | 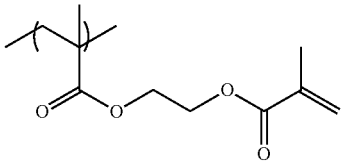 |
| A5 | 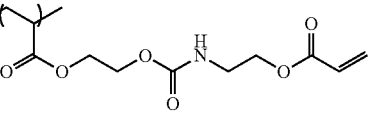 |
| A6 | 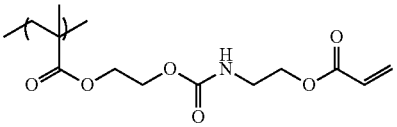 |
| A7 | 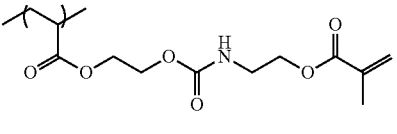 |
| A8 | 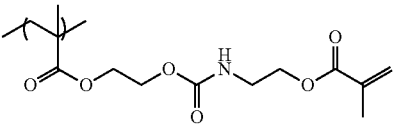 |
| A9 | 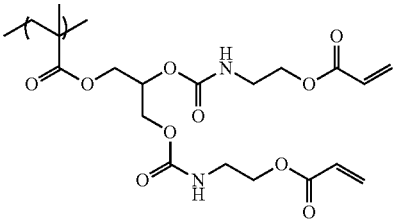 |
| A10 | 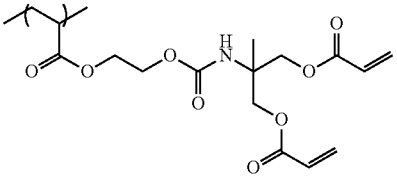 |
| A11 | 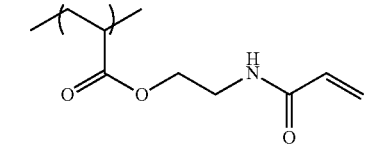 |
| A12 | 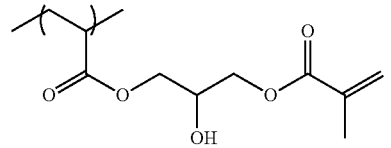 |
| A13 | 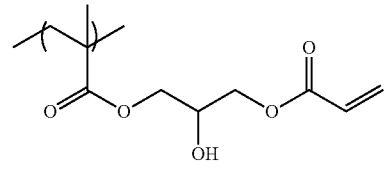 |
| A14 | 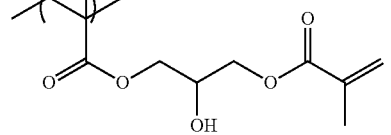 |

TABLE I-continued

| No. | Structure |
|---|---|
| A15 | 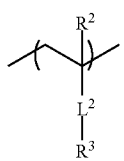 |
| A16 | |
| A17 | |
| A18 | |
| A19 | |
| A20 | |

The specific polymerizable polymer may contain a repeating unit (hereinafter, also referred to as "unit 2") other than the unit 1.

The unit 2 is not particularly limited and may be, for example, a repeating unit represented by Formula (2) from the viewpoint that the effect of the present invention is more excellent.

 (2)

$R^2$ represents a hydrogen atom or an alkyl group having 1 to 4 carbon atoms.

$L^2$ represents a single bond or a divalent linking group. Examples of the divalent linking group include the groups exemplified as the divalent linking group represented by $L^1$ described above.

$R^3$ represents a hydrocarbon group which may have a substituent. Above all, $R^3$ is preferably an aliphatic hydrocarbon group or an aromatic hydrocarbon group (preferably a benzene ring), which may have a substituent, from the viewpoint that the effect of the present invention is more excellent.

The number of carbon atoms contained in the aliphatic hydrocarbon group is not particularly limited, and is preferably 1 to 20 and more preferably 1 to 10.

The aliphatic hydrocarbon group may be linear or branched. In addition, the aliphatic hydrocarbon group may have a cyclic structure.

The substituent is not particularly limited, and examples thereof include an alkyl group, an alkoxy group, an alkyl-substituted alkoxy group, a cyclic alkyl group, an aryl group (for example, a phenyl group or a naphthyl group), a cyano group, an amino group, a nitro group, an alkylcarbonyl group, a sulfo group, and a hydroxyl group.

In a case where the specific polymerizable polymer contains another repeating unit, the content of unit 2 (for example, the repeating unit represented by Formula (2)) is not particularly limited and is preferably 80% by mass or less, more preferably 50% by mass or less, and still more preferably 30% by mass or less with respect to all the repeating units of the specific polymerizable polymer. The lower limit thereof is not particularly limited, and may be, for example, 10% by mass or more.

The weight-average molecular weight of the specific polymerizable polymer is not particularly limited, and is preferably 5,000 or more from the viewpoint that the effect of the present invention is more excellent. The upper limit thereof is not particularly limited, and is preferably 50,000 or less from the viewpoint that the effect of the present invention is more excellent.

The weight-average molecular weight and the number-average molecular weight in the present invention are values measured by a gel permeation chromatograph (GPC) method under the following conditions.
  Solvent (eluent): tetrahydrofuran (THF)
  Device name: TOSOH HLC-8320GPC
  Column: three TOSOH TSKgel Super HZM-H (4.6 mm×15 cm) connected in series
  Column temperature: 40° C.
  Sample concentration: 0.1% by mass
  Flow rate: 1.0 ml/min
  Calibration curve: calibration curve for 7 samples of TOSOH TSK standard polystyrene Mw=2,800,000 to 1,050 (Mw/Mn=1.03 to 1.06)

In addition to the above-mentioned polymerizable compound, a compound represented by Formula (3) is also preferable as the specific polymerizable compound.

$$R^4\text{-}L^3\text{-}R^5 \qquad \text{Formula (3)}$$

$R^4$ represents a polymerizable group. The definition of the polymerizable group is as described above.

$L^3$ represents a single bond or a divalent linking group. Examples of the divalent linking group include the groups exemplified as the divalent linking group represented by L described above.

$R^5$ represents a boronic acid group or a hydroxy group.

The absolute value of the difference between the SP value of the specific polymerizable compound and the SP value of the above-mentioned resin substrate is not particularly limited, and is preferably 2.7 $MPa^{1/2}$ or less and more preferably 2.0 $MPa^{1/2}$ or less from the viewpoint that the effect of the present invention is more excellent. The lower limit thereof is not particularly limited, and may be, for example, zero.

(Other Components)

The optically anisotropic layer may contain components other than the liquid crystal compound and the specific compound described above.

Examples of other components include other components (for example, a chiral agent) that can be contained in the composition used for forming an optically anisotropic layer which will be described later.

In addition, as will be described later, the optically anisotropic layer may contain a resin constituting the resin substrate. In particular, the resin constituting the resin substrate may be contained in the vicinity of the surface of the optically anisotropic layer on the resin substrate side.

(Requirement 1 and Requirement 2)

The optical film according to the embodiment of the present invention satisfies both the following requirement 1 and requirement 2 in a case where a surface of the optical film on an optically anisotropic layer side thereof is defined as a first surface and a surface of the optical film on a resin substrate side thereof is defined as a second surface, and components of the optical film in a depth direction are analyzed by time-of-flight secondary ion mass spectrometry while irradiating the optical film with an ion beam from the first surface toward the second surface.

Requirement 1: The optical film exhibits a maximum value Imax of a secondary ionic intensity derived from the compound having a heteroatom at any depth position between an A position and a B position, in a case where a depth position located closest to the second surface showing a secondary ion intensity, which is 80% of a maximum intensity of a secondary ion intensity derived from the liquid crystal compound, is defined as the A position, and a depth position located closest to the first surface showing a secondary ion intensity, which is 80% of a maximum intensity of a secondary ion intensity derived from a resin constituting the resin substrate, is defined as the B position.

Requirement 2: A distance between a C position and a D position is 100 nm or less, in a case where a depth position which shows a maximum value Imax of a secondary ion intensity derived from the compound having a heteroatom is defined as a peak position, a depth position which shows a secondary ion intensity of the maximum value Imax, is closer to the first surface side than the peak position, and is closest to the peak position is defined as the C position, and a depth position which shows a secondary ion intensity that is half of the maximum value Imax, is closer to the second surface side than the peak position, and is closest to the peak position is defined as the D position.

Hereinafter, the foregoing requirements will be described in detail with reference to the accompanying drawings. In the drawings shown below, the scale and the like are described in a form different from the actual data for the sake of making it easier to understand the content of the invention.

Figure 2:
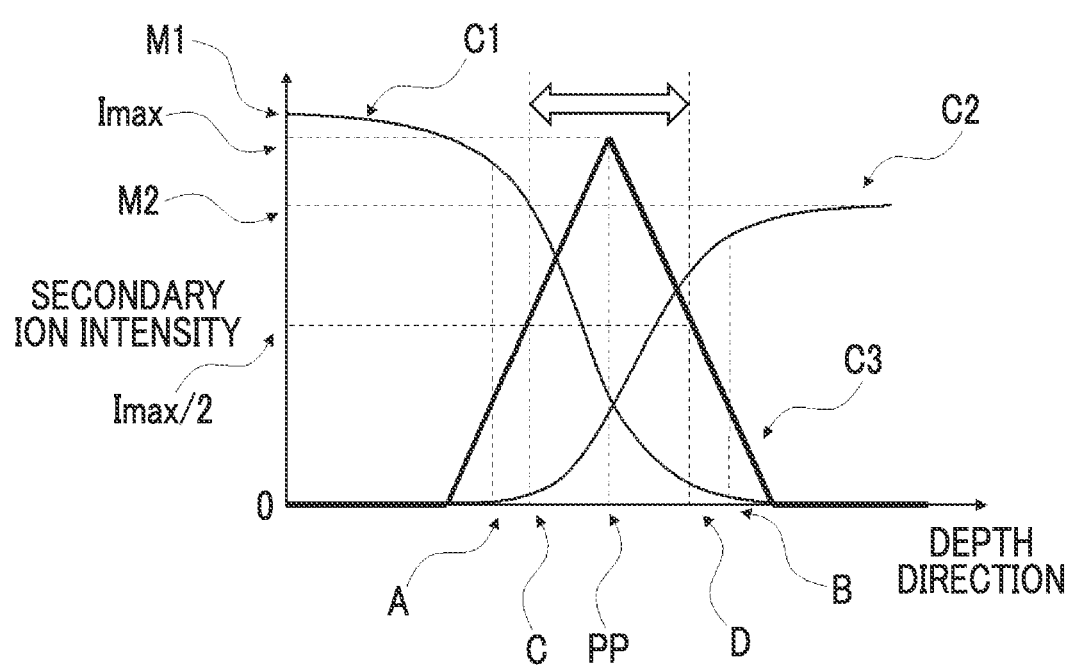
FIG. 2 is a schematic diagram for explaining a depth direction profile of a secondary ion intensity derived from each component detected by analyzing components of an optical film in a depth direction by time-of-flight secondary ion mass spectrometry (TOF-SIMS).

FIG. 2 shows an example of a profile obtained by analyzing the components in each layer in a depth direction by TOF-SIMS while ion-sputtering from a first surface 10A toward a second surface 10B of the optically anisotropic layer of FIG. 1.

In the present specification, the depth direction is intended to mean a direction toward the second surface of the optically anisotropic layer with reference to the first surface of the optically anisotropic layer.

As shown in FIG. 1, the surface of the optical film 10 on the optically anisotropic layer 14 side is defined as the first surface 10A, and the surface of the optical film 10 on the resin substrate 12 side is defined as the second surface 10B.

In the profile in a depth direction shown in FIG. 2, a lateral axis (an axis extending in a left-right direction of a paper surface in FIG. 2) represents a depth with reference to the first surface, and a vertical axis (an axis extending in a vertical direction of a paper surface in FIG. 2) represents a secondary ion intensity of each component.

The TOF-SIMS method is specifically described in "Surface Analysis Technology Library Secondary Ion Mass Spectrometry" edited by the Surface Science Society of Japan and published by Maruzen Co., Ltd. (1999).

In a case of analyzing the components of the optical film in a depth direction by TOF-SIMS while irradiating the optical film with an ion beam, a series of operations are repeated including carrying out the component analysis in a surface depth region of 1 to 2 nm, then digging further in a depth direction from 1 nm to several hundred nm, and carrying out the component analysis in the next surface depth region of 1 to 2 nm.

In the profile in a depth direction shown in FIG. 2, the result of the secondary ion intensity derived from the liquid crystal compound (C1 in the figure), the result of the secondary ion intensity derived from the resin constituting the resin substrate (C2 in the figure), and the result of the secondary ion intensity derived from the specific compound (C3 in the figure) are shown.

In the present specification, the "secondary ion intensity derived from a liquid crystal compound" determined by the profile in a depth direction detected by analyzing the components of the optical film in a depth direction by TOF-SIMS is intended to mean an intensity of fragment ions derived from the liquid crystal compound; the "secondary ion intensity derived from a resin" is intended to mean an intensity of fragment ions derived from the resin constituting a resin substrate; and the "secondary ion intensity derived from a specific compound" is intended to mean an intensity of fragment ions derived from the specific compound.

As shown in FIG. 2, in a case where the components of the optical film 10 in a depth direction are analyzed by the TOF-SIMS method while irradiating the optical film 10 with an ion beam from the first surface 10A side toward the second surface 10B side of the optical film 10 (toward the direction of the white arrow in FIG. 1), first, the secondary ion intensity derived from the liquid crystal compound in the optically anisotropic layer 14 is observed to be high, and in a case where the optical film 10 is further irradiated with an ion beam in a depth direction, the secondary ion intensity derived from the liquid crystal compound gradually decreases. This means being close to the resin substrate 12 from the optically anisotropic layer 14. Further, in a case where the components in a depth direction are analyzed while irradiating the optical film 10 with an ion beam in a depth direction, it reaches the resin substrate 12, and the secondary ion intensity derived from the liquid crystal compound is no longer observed.

In addition, as shown in FIG. 2, in a case where the components are analyzed from the first surface 10A side toward the second surface 10B side, the secondary ion intensity derived from the resin constituting the resin substrate 12 increases toward the second surface 10B side. Further, in a case where the components are analyzed in a depth direction, it reaches the resin substrate 12, and the secondary ion intensity derived from the resin constituting the resin substrate 12 becomes the highest.

In FIG. 2, the result of the secondary ion intensity derived from the specific compound (C3 in the figure) is shown. As shown in FIG. 2, secondary ions derived from the specific compound are strongly observed mainly in a region where both secondary ions derived from the liquid crystal compound and secondary ions derived from the resin are observed.

More specifically, first, in the profile in a depth direction shown in FIG. 2, a depth position located closest to the second surface showing a secondary ion intensity which is 80% of the maximum strength of the secondary ion intensity derived from the liquid crystal compound is defined as a position A, and a depth position located closest to the first surface showing a secondary ion intensity which is 80% of the maximum strength of the secondary ion intensity derived from the resin constituting the resin substrate is defined as a position B.

In FIG. 2, since the maximum intensity of the secondary ion intensity derived from the liquid crystal compound corresponds to M1, a depth position located closest to the second surface (a position closest to the second surface) showing a secondary ion intensity of 80% of M1 is defined as the A position. Therefore, for example, in a case where there are a plurality of depth positions showing a secondary ion intensity of 80% of M1, a depth position located closest to the second surface is defined as the A position.

In addition, in FIG. 2, since the maximum intensity of the secondary ion intensity derived from the resin corresponds to M2, a depth position located closest to the first surface (a position closest to the first surface) showing an intensity of 80% of M2 is defined as the B position. Therefore, for example, in a case where there are a plurality of depth positions showing a secondary ion intensity of 80% of M2, a depth position located closest to the first surface is defined as the B position.

Since noise due to foreign matter may occur in the vicinity of the first surface and the vicinity of the second surface, the secondary ion intensity of each component is not taken into account in a case of calculating the maximum intensity described above, in a region of 50 nm from the first surface toward the second surface side (hereinafter, also referred to as a first surface region) and a region of 50 nm from the second surface toward the first surface side (hereinafter, also referred to as a second surface region). More specifically, with regard to the maximum intensity of the secondary ion intensity derived from the liquid crystal compound, an intensity which is a maximum out of the secondary ion intensities derived from the liquid crystal compound, in a region excluding the first surface region and the second surface region in the obtained profile of the secondary ion intensity derived from the liquid crystal compound, is calculated as the maximum intensity. In addition, with regard to the maximum intensity of the secondary ion intensity derived from the resin, an intensity which is a maximum out of the secondary ion intensities derived from the resin, in a region excluding the first surface region and the second surface region in the obtained profile of the secondary ion intensity derived from the resin, is calculated as the maximum intensity.

In the requirement 1, the maximum value Imax of the secondary ion intensity derived from the specific compound is shown at any depth position between the A position and the B position specified above. In FIG. 2, the maximum value Imax is shown at the peak position PP. That is, the maximum value Imax of the secondary ion intensity derived from the specific compound is observed between the A position and the B position.

In the optical film satisfying the requirement 1, the specific compound is unevenly distributed on the resin substrate side in the optically anisotropic layer. Satisfying such a requirement 1 results in improved adhesiveness between the resin substrate and the optically anisotropic layer.

As shown in FIG. 2, in the optical film, it is preferable that a peak showing the maximum value Imax is observed at the peak position PP located between the A position and the B position.

In addition, as shown in FIG. 2, the distance indicated by a white arrow between a C position and a D position (hereinafter, also referred to as Iwid) is 100 nm or less, in a case where a depth position which shows a secondary ion intensity that is half of the maximum value Imax (Imax/2), is closer to the first surface side than the peak position, and is closest to the peak position is defined as the C position, and a depth position which shows a secondary ion intensity that is half of the maximum value Imax (Imax/2), is closer to the second surface side than the peak position, and is closest to the peak position is defined as the D position.

In the optical film satisfying the requirement 2, the amount of the specific compound unevenly distributed is not more than a predetermined amount. That is, in a case where the amount of the specific compound unevenly distributed is too large, the Iwid will be greater than 100 nm. Satisfying such a requirement 2 results in improved aligning properties of the liquid crystal compound in the optically anisotropic layer, and suppression of occurrence of optical defects in the optically anisotropic layer. In a case where the requirement 2 is not satisfied, the amount of the specific compound is too large, so that the alignment regulating force of the resin substrate is weakened and therefore the aligning properties of the liquid crystal compound are deteriorated.

Above all, the Iwid is preferably 50 nm or less from the viewpoint that the occurrence of optical defects in the optically anisotropic layer is further suppressed. The lower limit of the Iwid is not particularly limited, and is often 1 nm or more and more often 5 nm or more.

Above all, from the viewpoint that the effect of the present invention is more excellent, a maximum value Imax and an average value Iave preferably satisfy a relationship of Expression (A) in a case where an average intensity of a secondary ion intensity derived from the specific compound from the first surface to the A position is defined as the average value Iave.

$$1.3 \leq Imax/Iave \quad \quad \text{Expression (A)}$$

Above all, Imax/Iave is preferably 50 or more and more preferably 100 or more from the viewpoint that the effect of the present invention is more excellent. The upper limit of Imax/Iave is not particularly limited, and Imax/Iave is often 1,000 or less and more often 500 or less.

However, since noise due to foreign matter may occur in the vicinity of the first surface, the secondary ion intensity derived from the specific compound is not taken into account in a case of calculating the Iave described above, in a region of 50 nm from the first surface toward the second surface side (first surface region). More specifically, the Iave is defined as an average intensity of the secondary ion intensity derived from the specific compound in the region from the first surface to the A position excluding the first surface region, in the obtained profile of the secondary ion intensity derived from the specific compound.

<Production Method>

The method for producing the optical film according to embodiment of the present invention is not particularly limited, and is preferably a method using a composition containing a polymerizable liquid crystal compound and a specific polymerizable compound (hereinafter, also simply referred to as "specific composition"), from the viewpoint that an optical film can be produced with high productivity. More specifically, the method for producing the optical film according to embodiment of the present invention is more preferably a method in which the specific composition is applied onto a resin substrate having an alignment regulating force to form a composition layer, a polymerizable liquid crystal compound in the composition layer is aligned, and then an alignment state of the polymerizable liquid crystal compound is immobilized to produce an optical film having a resin substrate and an optically anisotropic layer formed on the resin substrate.

Hereinafter, the procedure of the above method will be described in detail.

The resin substrate having an alignment regulating force used in the above production method is as described above.

The polymerizable liquid crystal compound and the specific polymerizable compound (preferably the specific polymerizable polymer) contained in the specific composition are as described above.

The content of the polymerizable liquid crystal compound in the specific composition is not particularly limited, and is preferably 50% by mass or more and more preferably 70% by mass or more with respect to the total solid content in the specific composition. The upper limit thereof is not particularly limited, and is often 90% by mass or less.

The content of the specific polymerizable compound in the specific composition is preferably 10% by mass or less, more preferably 5% by mass or less, and still more preferably 2% by mass or less with respect to the total mass of the polymerizable liquid crystal compound. The lower limit thereof is not particularly limited, and is preferably 0.1% by mass or more and more preferably 0.3% by mass or more.

The solid content means a component capable of forming an optically anisotropic layer from which a solvent in the specific composition has been removed, and even in a case where a component itself is in a liquid state, such a component is regarded as the solid content.

The specific composition may contain components other than the polymerizable liquid crystal compound and the specific polymerizable compound described above.

For example, the specific composition may contain a solvent.

Examples of the solvent include an ester-based solvent, an ether-based solvent, an amide-based solvent, a carbonate-based solvent, a ketone-based solvent, an aliphatic hydrocarbon-based solvent, an alicyclic hydrocarbon-based solvent, an aromatic hydrocarbon-based solvent, a halocarbon-based solvent, water, and an alcohol-based solvent. Of these, an ester-based solvent, an ether-based solvent, an amide-based solvent, a carbonate-based solvent, or a ketone-based solvent is preferable.

In addition, only one type of solvent may be used, or two or more types of solvents may be mixed and used.

The specific composition may contain a polymerization initiator. In a case where the specific composition contains a polymerization initiator, the polymerization of the polymerizable liquid crystal compound proceeds more efficiently.

The polymerization initiator may be, for example, a known polymerization initiator, examples of which include a photopolymerization initiator and a thermal polymerization initiator, among which a photopolymerization initiator is preferable.

The content of the polymerization initiator in the specific composition is not particularly limited, and is preferably 0.01% to 20% by mass and more preferably 0.5% to 10% by mass with respect to the total solid content in the specific composition.

The specific composition may contain a surfactant. Examples of the surfactant include conventionally known compounds, among which a fluorine-based compound is preferable. Specific examples of the surfactant include compounds described in paragraphs [0028] to [0056] of JP2001-330725A and compounds described in paragraphs [0069] to [0126] of JP2005-062673A.

The specific composition may contain a polymer. Examples of the polymer include cellulose esters. Examples of the cellulose ester include cellulose esters described in paragraph [0178] of JP2000-155216A.

The content of the polymer in the specific composition is not particularly limited, and is preferably 0.1% to 10% by mass and more preferably 0.1% to 8% by mass with respect to the total mass of the polymerizable liquid crystal compound.

The specific composition may contain an additive (alignment control agent) that promotes horizontal alignment or vertical alignment in order to bring a polymerizable liquid crystal compound into a horizontal alignment state or a vertical alignment state.

The specific composition may further contain a chiral agent. In a case where the specific composition contains a chiral agent, the polymerizable liquid crystal compound can be twist-aligned along a helical axis.

The type of chiral agent is not particularly limited. Any of the known chiral agents (for example, "Liquid Crystal Device Handbook" edited by the 142nd Committee of the Japan Society for the Promotion of Science, Chapter 3, 4-3, Chiral agent for TN and STN, p. 199, 1989) can be used.

The helical twisting power (HTP) of the chiral agent is a factor indicating a helical alignment ability expressed by Expression (X).

$$\text{HTP}=1/(\text{length (unit:}\mu\text{m}) \text{ of helical pitch} \times \text{concentration (\% by mass) of chiral agent with respect to liquid crystal compound)} \, [\mu m^{-1}] \quad \text{Expression (X)}$$

The length of the helical pitch refers to a length of pitch P (=the period of the helix) of a helical structure of the cholesteric liquid crystalline phase and can be measured by the method described in Handbook of Liquid Crystals (published by Maruzen Co., Ltd.), p. 196.

The chiral agent may be a photosensitive chiral agent whose helical twisting power changes upon irradiation with light (hereinafter, also simply referred to as "chiral agent A"). The chiral agent A may be liquid crystalline or non-liquid crystalline. The chiral agent A generally contains an asymmetric carbon atom in many cases. The chiral agent A may be an axial asymmetric compound or planar asymmetric compound that does not contain an asymmetric carbon atom.

The chiral agent A may have a polymerizable group.

The chiral agent A may be a chiral agent whose helical twisting power increases upon irradiation with light, or may be a chiral agent whose helical twisting power decreases upon irradiation with light. Of these, a chiral agent whose helical twisting power decreases upon irradiation with light is preferable.

The "increase and decrease in helical twisting power" in the present specification represent increase/decrease in helical twisting power in a case where an initial helical direction (helical direction before light irradiation) of the chiral agent A is set to "positive". Therefore, even in a case where the helical twisting power of a chiral agent continues to decrease and goes below zero upon irradiation with light and therefore the helical direction becomes "negative" (that is, even in a case where a chiral agent induces a helix in a helical direction opposite to an initial helical direction (before light irradiation)), such a chiral agent also corresponds to a "chiral agent whose helical twisting power decreases".

The chiral agent A may be, for example, a so-called photoreactive chiral agent. The photoreactive chiral agent is a compound which has a chiral site and a photoreactive site that undergoes a structural change upon irradiation with light and which greatly changes a twisting power of a liquid crystal compound according to an irradiation amount, for example.

Above all, the chiral agent A is preferably a compound having at least a photoisomerization site, and the photoisomerization site more preferably has a photoisomerizable double bond. The photoisomerization site having a photoisomerizable double bond is preferably a cinnamoyl site, a chalcone site, an azobenzene site, or a stilbene site from the viewpoint that photoisomerization is likely to occur and the difference in helical twisting power before and after light irradiation is large; and more preferably a cinnamoyl site, a chalcone site, or a stilbene site from the viewpoint that the absorption of visible light is small. The photoisomerization site corresponds to the above-mentioned photoreactive site that undergoes a structural change upon irradiation with light.

In addition, the chiral agent A preferably has any partial structure selected from a binaphthyl partial structure, an isosorbide partial structure (a partial structure derived from isosorbide), and an isomannide partial structure (a partial structure derived from isomannide). The binaphthyl partial structure, the isosorbide partial structure, and the isomannide partial structure are intended to have the following structures, respectively.

The portion of the binaphthyl partial structure in which the solid line and the broken line are parallel to each other represents a single bond or a double bond. In the structures shown below, * represents a bonding position.

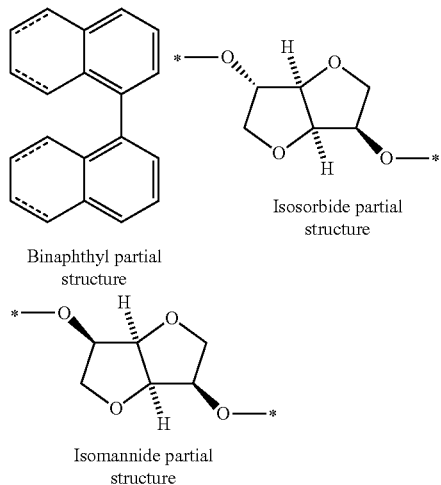

Binaphthyl partial structure

Isosorbide partial structure

Isomannide partial structure

The specific composition may contain two or more chiral agents A, or may contain at least one chiral agent A and at least one chiral agent whose helical twisting power does not change upon irradiation with light (hereinafter, simply referred to as "chiral agent B").

The chiral agent B may be liquid crystalline or non-liquid crystalline. The chiral agent B generally contains an asymmetric carbon atom in many cases. The chiral agent B may be an axial asymmetric compound or planar asymmetric compound that does not contain an asymmetric carbon atom.

The chiral agent B may have a polymerizable group.

A known chiral agent can be used as the chiral agent B.

The chiral agent B is preferably a chiral agent that induces a helix in a direction opposite to the direction of the helix induced by the chiral agent A. That is, for example, in a case where the helix induced by the chiral agent A is right-handed, the helix induced by the chiral agent B is left-handed.

The absolute value of the weighted average helical twisting power of the chiral agent is preferably 0.0 to 1.9 $\mu m^{-1}$, more preferably 0.0 to 1.5 $\mu m^{-1}$, still more preferably 0.0 to 1.0 $\mu m^{-1}$, particularly preferably 0.0 to 0.5 $\mu m^{-1}$, and most preferably zero.

In a case where the absolute value of the weighted average helical twisting power of the chiral agent is in the above range, it is easy to form an optically anisotropic layer having two or more layers having different optical properties along a thickness direction, depending on the production conditions of the optically anisotropic layer, as will be described later.

The weighted average helical twisting power of the chiral agent represents a total value obtained by dividing the product of the helical twisting power of each chiral agent and the concentration (% by mass) of each chiral agent with respect to the polymerizable liquid crystal compound by the total concentration (% by mass) of the chiral agents with respect to the polymerizable liquid crystal compound, in a case where two or more chiral agents are contained in the specific composition. The weighted average helical twisting power is represented by Expression (Y), for example, in a case where two chiral agents (chiral agent X and chiral agent Y) are used in combination.

Weighted average helical twisting power ($\mu m^{-1}$)= (helical twisting power ($\mu m^{-1}$) of chiral agent X×concentration (% by mass) of chiral agent X with respect to polymerizable liquid crystal compound+helical twisting power ($\mu m^{-1}$) of chiral agent Y×concentration (% by mass) of chiral agent Y with respect to polymerizable liquid crystal compound)/(concentration (% by mass) of chiral agent X with respect to polymerizable liquid crystal compound+concentration (% by mass) of chiral agent Y with respect to polymerizable liquid crystal compound)  Expression (Y)

However, in Expression (Y), in a case where the helical direction of the chiral agent is dextrorotatory, the helical twisting power has a positive value. In addition, in a case where the helical direction of the chiral agent is levorotatory, the helical twisting power has a negative value. That is, for example, in a case of a chiral agent having a helical twisting power of 10 $\mu m^{-1}$, the helical twisting power is expressed as 10 $\mu m^{-1}$ in a case where the helical direction of the helix induced by the chiral agent is dextrorotatory. On the other hand, in a case where the helical direction of the helix induced by the chiral agent is levorotatory, the helical twisting power is expressed as -10 $\mu m^{-1}$.

The content of the chiral agent A in the specific composition is not particularly limited, and is preferably 5.0% by mass or less, more preferably 3.0% by mass or less, and still more preferably 2.0% by mass or less with respect to the total mass of the polymerizable liquid crystal compound, from the viewpoint that the polymerizable liquid crystal compound is likely to be uniformly aligned. The lower limit thereof is not particularly limited, and is preferably 0.01% by mass or more and more preferably 0.02% by mass or more.

The chiral agent A may be used alone or in combination of two or more thereof. In a case where two or more of the chiral agents A are used in combination, the total content thereof is preferably within the above range.

The content of the chiral agent B in the specific composition is not particularly limited, and is preferably 5.0% by mass or less, more preferably 3.0% by mass or less, and still more preferably 2.0% by mass or less with respect to the total mass of the polymerizable liquid crystal compound, from the viewpoint that the polymerizable liquid crystal compound is likely to be uniformly aligned. The lower limit thereof is not particularly limited, and is preferably 0.01% by mass or more and more preferably 0.02% by mass or more.

The chiral agent B may be used alone or in combination of two or more thereof. In a case where two or more of the chiral agents B are used in combination, the total content thereof is preferably within the above range.

The total content of the chiral agent (total content of all chiral agents) in the specific composition is preferably 5.0% by mass or less, more preferably 4.0% by mass or less, and still more preferably 2.0% by mass or less with respect to the total mass of the polymerizable liquid crystal compound. The lower limit thereof is not particularly limited, and is preferably 0.01% by mass or more and more preferably 0.02% by mass or more.

(Procedure)

In a case of producing an optical film, a specific composition is applied onto a resin substrate to form a composition layer. The specific composition is applied directly onto the resin substrate. In other words, the specific composition is applied such that the surface of the resin substrate is in contact with the specific composition.

The application method is not particularly limited, and examples thereof include a wire bar coating method, an extrusion coating method, a direct gravure coating method, a reverse gravure coating method, and a die-coating method.

If necessary, a treatment of drying the composition layer applied onto the resin substrate may be carried out after the application of the specific composition. The solvent can be removed from the composition layer by carrying out the drying treatment.

The film thickness of the composition layer is not particularly limited and is preferably 0.1 to 20 µm, more preferably 0.2 to 15 µm, and still more preferably 0.5 to 10 µm.

Next, the polymerizable liquid crystal compound in the composition layer is aligned.

The treatment for aligning the polymerizable liquid crystal compound is not particularly limited, and is preferably a heat treatment.

With regard to heat treatment conditions, the optimum conditions are selected according to the polymerizable liquid crystal compound used.

Above all, the heating temperature is often 10° C. to 250° C., more often 40° C. to 150° C., and still more often 50° C. to 130° C.

The heating time is often 0.1 to 60 minutes and more often 0.2 to 5 minutes.

The alignment state of the polymerizable liquid crystal compound depends on the material in the composition layer. Examples of the alignment state include homogeneous alignment. In addition, in a case where the composition layer contains a chiral agent, the polymerizable liquid crystal compound is twist-aligned along a helical axis extending along the thickness direction of the composition layer.

Next, the alignment state of the polymerizable liquid crystal compound is immobilized to form an optically anisotropic layer.

The method for immobilizing the alignment state is not particularly limited, and examples thereof include a method of subjecting the composition layer to a curing treatment and reacting the polymerizable groups in the polymerizable liquid crystal compound to form an optically anisotropic layer (cured layer).

The method of the curing treatment is not particularly limited, and examples thereof include a photocuring treatment and a thermal curing treatment. Above all, a light irradiation treatment is preferable, and an ultraviolet irradiation treatment is more preferable.

For ultraviolet irradiation, a light source such as an ultraviolet lamp is used.

The irradiation amount of light (for example, ultraviolet rays) is not particularly limited, and is generally preferably about 100 to 800 mJ/cm$^2$.

The alignment state of the polymerizable liquid crystal compound is fixed in the optically anisotropic layer obtained by carrying out the curing treatment.

The optically anisotropic layer may be, for example, a layer formed by fixing a homogeneously aligned polymerizable liquid crystal compound. In addition, the optically anisotropic layer may also be, for example, a layer formed by fixing a twist-aligned polymerizable liquid crystal compound with a helical axis in a thickness direction.

The "fixed" state means a state in which the alignment of the liquid crystal compound is maintained. The "fixed" state is not limited thereto and is specifically preferably a state in which, in a temperature range of usually 0° C. to 50° C. or in a temperature range of −30° C. to 70° C. under more severe conditions, the layer has no fluidity and a fixed alignment morphology can be maintained stably without causing a change in the alignment morphology due to an external field or an external force.

In the optically anisotropic layer, it is no longer necessary for the composition in the layer to finally exhibit liquid crystallinity.

The optically anisotropic layer may have a monolayer structure or a polylayer structure. The polylayer structure means a structure in which two or more layers having different optical properties are laminated.

For example, in a case where the specific composition contains the chiral agent A, the following step A to step E can be carried out to produce an optically anisotropic layer having two layers having different optical properties in one coating step.

Step A: a step of applying a specific composition containing a chiral agent A onto a resin substrate to form a composition layer.

Step B: a step of subjecting the composition layer to a heat treatment to align a polymerizable liquid crystal compound in the composition layer Step C: a step of subjecting the composition layer to light irradiation under a condition of an oxygen concentration of 1% by volume or more, after the step B Step D: a step of subjecting the composition layer to a heat treatment, after the step C.

Step E: a step of subjecting the composition layer to a curing treatment to fix an alignment state of the polymerizable liquid crystal compound to form an optically anisotropic layer, after the step D Hereinafter, the procedure of each of the above steps will be described in detail.

(Step A)

Examples of the procedure of the step A include the above-mentioned procedure of applying the specific composition.

The specific composition used in the step A contains a chiral agent A in addition to the above-mentioned polymerizable liquid crystal compound and specific polymerizable compound. As will be described later, the specific composition may contain a chiral agent B.

(Step B)

The procedure of the step B is not particularly limited, and examples thereof include the above-mentioned method of aligning a polymerizable liquid crystal compound.

(Step C)

The step C will be described below with reference to the accompanying drawings.

In the following description, a case where the specific composition contains two types of chiral agents, chiral agent A and chiral agent B, and the absolute value of the weighted average helical twisting power of the chiral agent in the composition layer formed by the step A is zero will be typically described.

Figure 3:
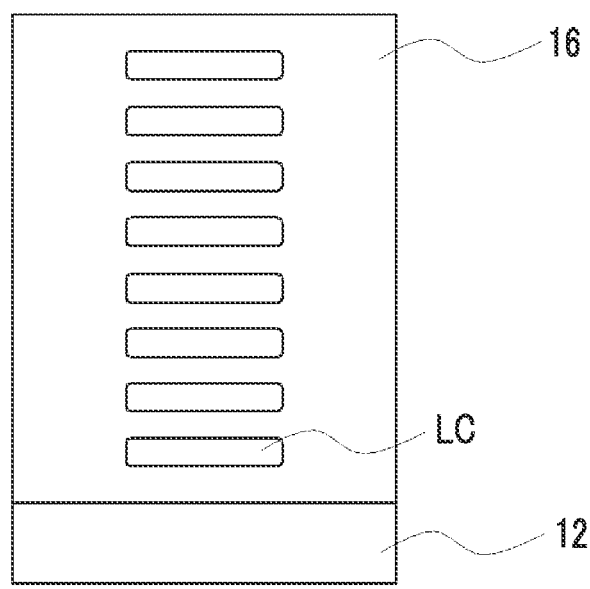
FIG. 3 is a cross-sectional view of a composition layer for explaining a step A.

As shown in FIG. 3, a composition layer 16 in which a polymerizable liquid crystal compound LC is homogeneously aligned is formed on a resin substrate 12 by the step B. It should be noted that FIG. 3 is a schematic cross-sectional view of the resin substrate 12 and the composition layer 16. It is assumed that the chiral agent A and the chiral agent B are present in the composition layer 16 shown in FIG. 3 at the same concentration, the helical direction induced by the chiral agent A is levorotatory, and the helical direction induced by the chiral agent B is dextrorotatory. In addition, the absolute value of the helical twisting power of the chiral agent A and the absolute value of the helical twisting power of the chiral agent B are assumed to be the same.

Figure 4:
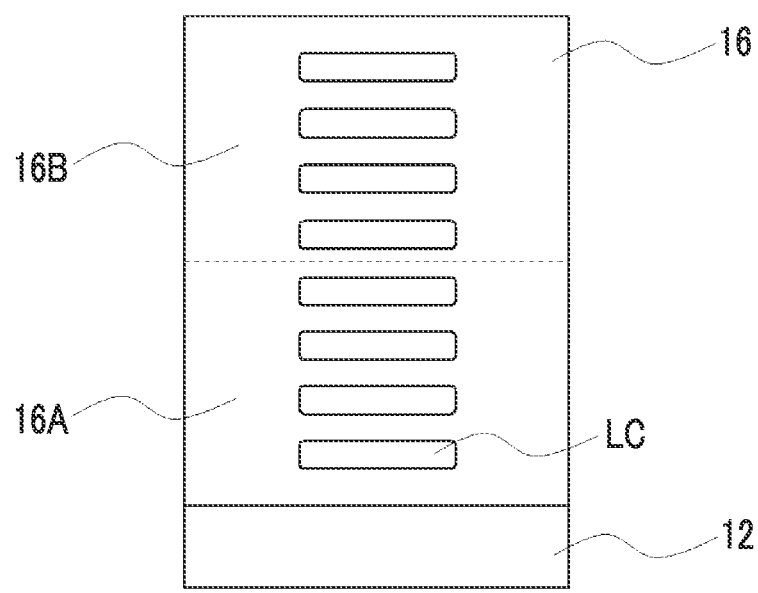
FIG. 4 is a cross-sectional view of a composition layer for explaining a step B.
Figure 4:

As shown in FIG. 4, in the above-mentioned step C, light irradiation is carried out from the direction opposite to the composition layer 16 side of the resin substrate 12 (the direction of the white arrow in FIG. 4) under the condition that the oxygen concentration is 1% by volume or more. Although the light irradiation is carried out from the resin substrate 12 side in FIG. 4, the light irradiation may be carried out from the composition layer 16 side.

At that time, in a case where a lower region 16A of the composition layer 16 on the resin substrate 12 side and an upper region 16B on the side opposite to the resin substrate 12 side are compared, the surface of the upper region 16B is on the air side, so that the oxygen concentration in the upper region 16B is high and the oxygen concentration in the lower region 16A is low. Therefore, in a case where the composition layer 16 is irradiated with light, the polymerization of the polymerizable liquid crystal compound easily proceeds in the lower region 16A, and the alignment state of the polymerizable liquid crystal compound is fixed. The chiral agent A is also present in the lower region 16A, and the chiral agent A is also exposed to light and therefore the helical twisting power changes. However, since the alignment state of the polymerizable liquid crystal compound is fixed in the lower region 16A, there is no change in the alignment state of the polymerizable liquid crystal compound even in a case where the step D of subjecting the light-irradiated composition layer to a heat treatment, which will be described later, is carried out.

In addition, since the oxygen concentration is high in the upper region 16B, the polymerization of the polymerizable liquid crystal compound is inhibited by oxygen and therefore the polymerization does not proceed easily even in a case where light irradiation is carried out. Since the chiral agent A is also present in the upper region 16B, the chiral agent A is exposed to light and therefore the helical twisting power changes. Therefore, in a case where the step D (heat treatment) which will be described later is carried out, the alignment state of the polymerizable liquid crystal compound changes along with the changed helical twisting power.

That is, the immobilization of the alignment state of the polymerizable liquid crystal compound is likely to proceed in the resin substrate-side region (lower region) of the composition layer by carrying out the step C. In addition, the immobilization of the alignment state of the polymerizable liquid crystal compound is difficult to proceed in the region of the composition layer (upper region) opposite to the resin substrate side, and the helical twisting power changes according to the exposed chiral agent A.

The step C is carried out under the condition that the oxygen concentration is 1% by volume or more. Above all, the oxygen concentration is preferably 2% by volume or more and more preferably 5% by volume or more from the viewpoint that layers having different alignment states of the polymerizable liquid crystal compound are likely to be formed in the optically anisotropic layer. The upper limit thereof is not particularly limited and may be, for example, 100% by volume.

The irradiation intensity of the light irradiation in the step C is not particularly limited and can be appropriately determined based on the helical twisting power of the chiral agent A. The irradiation amount of light irradiation in the step C is not particularly limited, and is preferably 300 mJ/cm$^2$ or less and more preferably 200 mJ/cm$^2$ or less from the viewpoint that a predetermined optically anisotropic layer is easily formed. The lower limit thereof is preferably 10 mJ/cm$^2$ or more and more preferably 30 mJ/cm$^2$ or more from the viewpoint that a predetermined optically anisotropic layer is easily formed.

The light irradiation in the step C is preferably carried out at 15° C. to 70° C. (preferably 15° C. to 50° C.).

The light used for the light irradiation may be any light that the chiral agent A is exposed to. That is, the light used for the light irradiation is not particularly limited as long as it is an actinic ray or radiation that changes the helical twisting power of the chiral agent A, and examples thereof include an emission line spectrum of a mercury lamp, a far ultraviolet ray represented by an excimer laser, an extreme ultraviolet ray, an X-ray, an ultraviolet ray, and an electron beam. Of these, an ultraviolet ray is preferable.

(Step D)

The step D is a step of subjecting the composition layer to a heat treatment, after the step C. Carrying out this step leads to a change in the alignment state of the liquid crystal compound in the region where the helical twisting power of the chiral agent A in the composition layer subjected to light irradiation changes.

In the following, the mechanism of this step will be described with reference to the accompanying drawings.

As described above, in a case where the step C is carried out on the composition layer 16 shown in FIG. 3, the alignment state of the polymerizable liquid crystal compound is fixed in the lower region 16A, whereas the polymerization of the polymerizable liquid crystal compound is difficult to proceed and the alignment state of the polymerizable liquid crystal compound is not fixed in the upper region 16B, as shown in FIG. 4. In addition, the helical twisting power of the chiral agent A changes in the upper region 16B. In a case where such a change in the helical twisting power of the chiral agent A occurs, the force of twisting the polymerizable liquid crystal compound changes in the upper region 16B, as compared with the state before light irradiation. This point will be described in more detail.

As described above, the chiral agent A and the chiral agent B are present in the composition layer 16 shown in FIG. 3 at the same concentration, the helical direction induced by the chiral agent A is levorotatory, and the helical direction induced by the chiral agent B is dextrorotatory. In addition, the absolute value of the helical twisting power of the chiral agent A and the absolute value of the helical twisting power of the chiral agent B are the same. Therefore, the weighted average helical twisting power of the chiral agent in the composition layer before light irradiation is zero.

Figure 5:
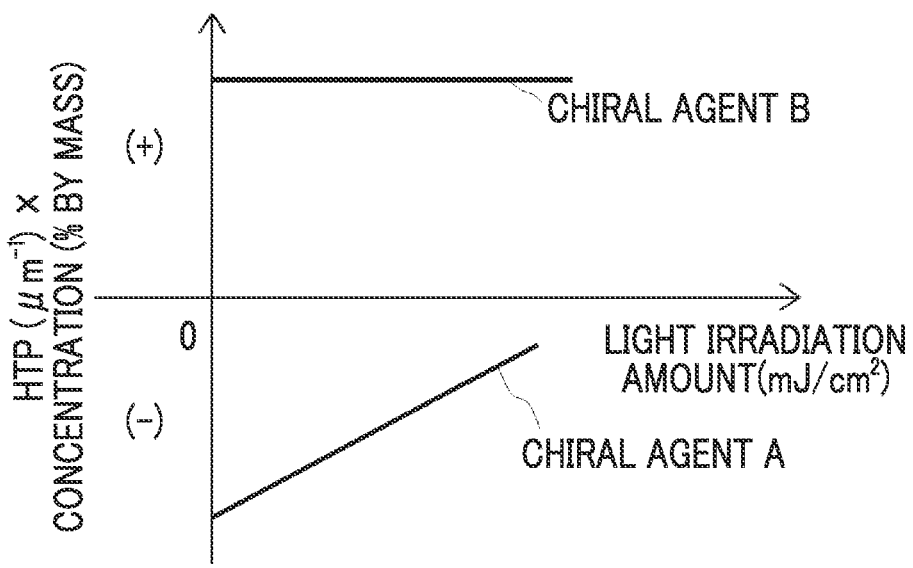
FIG. 5 is a schematic diagram of a graph plotting a relationship between a helical twisting power (HTP) ($\mu m^{-1}$)×a concentration (% by mass) and a light irradiation amount (mJ/cm$^2$) for each of chiral agent A and chiral agent B.

The above aspect is shown in FIG. 5. In addition, in FIG. 5, the vertical axis represents the "helical twisting power ($\mu m^{-1}$) of chiral agent×concentration (% by mass) of chiral agent", and the helical twisting power increases as the value thereof deviates from zero. The lateral axis represents the "light irradiation amount (mJ/cm$^2$)".

First, the relationship between the chiral agent A and the chiral agent B in the composition layer before light irradiation corresponds to the time in a case where the light irradiation amount is zero, and therefore corresponds to a state in which the absolute value of "helical twisting power ($\mu m^{-1}$) of chiral agent A×concentration (% by mass) of chiral agent A" and the absolute value of "helical twisting power ($\mu m^{-1}$) of chiral agent B×concentration (% by mass) of chiral agent B" are equal. That is, the helical twisting powers of both the chiral agent A that induces levorotatory turning and the chiral agent B that induces dextrorotatory turning are offset.

Figure 6:
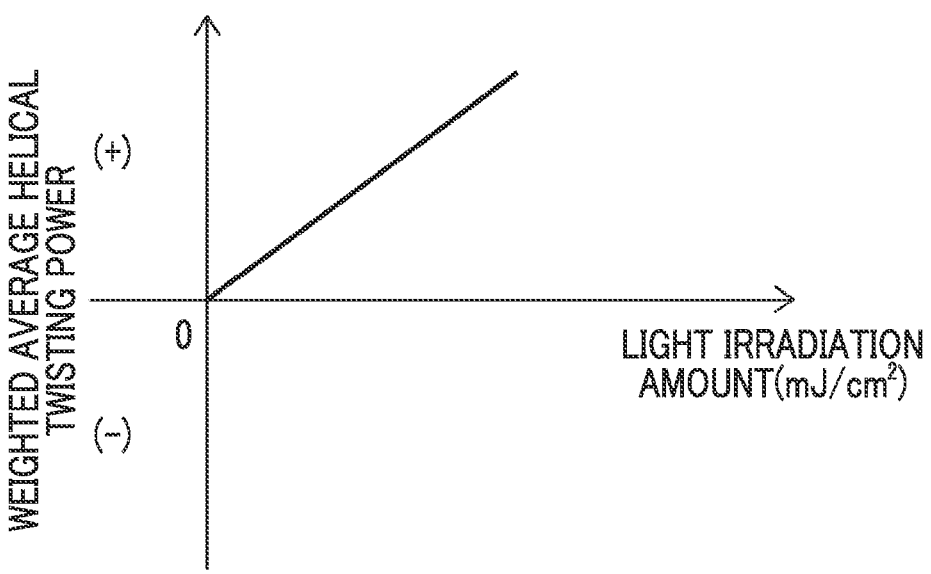
FIG. 6 is a schematic diagram of a graph plotting a relationship between a weighted average helical twisting power (μm$^{-1}$) and a light irradiation amount (mJ/cm$^2$) in a system in which chiral agent A and chiral agent B are used in combination.

In a case where light irradiation is carried out in the upper region 16B in such a state and the helical twisting power of the chiral agent A decreases with the light irradiation amount as shown in FIG. 5, the weighted average helical twisting power of the chiral agent in the upper region 16B becomes large and therefore the dextrorotatory helical twisting power becomes strong, as shown in FIG. 6. That is, as for the helical twisting power that induces the helix of the polymerizable liquid crystal compound, an increase in the irradiation amount leads to an increase in the helical twisting power in the direction (+) of the helix induced by the chiral agent B.

Therefore, in a case where the composition layer 16 after the step C in which such a change in the weighted average helical twisting power occurred is subjected to a heat treatment to promote the realignment of the liquid crystal compound, the polymerizable liquid crystal compound LC is twist-aligned along a helical axis extending along the thickness direction of the composition layer 16 in the upper region 16B, as shown in FIG. 4.

On the other hand, as described above, the polymerization of the polymerizable liquid crystal compound proceeds to fix the alignment state of the polymerizable liquid crystal compound during the step C in the lower region 16A of the composition layer 16, so that the realignment of the polymerizable liquid crystal compound does not proceed.

As described above, carrying out the step D leads to the formation of a plurality of regions having different alignment states of the polymerizable liquid crystal compound along the thickness direction of the composition layer.

The degree of twist of the polymerizable liquid crystal compound LC can be appropriately adjusted depending on the type of chiral agent A used, the exposure amount in the step C, and the like.

The aspect in which a chiral agent whose helical twisting power decreases upon irradiation with light is used as the chiral agent A has been described in FIGS. 3 and 4, but the present invention is not limited to this aspect. For example, a chiral agent whose helical twisting power increases upon irradiation with light may be used as the chiral agent A. In that case, the helical twisting power induced by the chiral agent A increases upon irradiation with light and therefore the liquid crystal compound is twist-aligned in the turning direction induced by the chiral agent A.

In addition, the aspect in which the chiral agent A and the chiral agent B are used in combination has been described in FIGS. 3 and 4, but the present invention is not limited to this aspect. For example, it may be an aspect in which two types of chiral agents A are used. Specifically, it may be an aspect in which a chiral agent A1 that induces levorotatory turning and a chiral agent A2 that induces dextrorotatory turning are used in combination. The chiral agents A1 and A2 may be each independently a chiral agent whose helical twisting power increases or a chiral agent whose helical twisting power decreases. For example, a chiral agent that induces levorotatory turning and whose helical twisting power increases upon irradiation with light and a chiral agent that induces dextrorotatory turning and whose helical twisting power decreases upon irradiation with light may be used in combination.

With regard to heat treatment conditions, the optimum conditions are selected according to the liquid crystal compound used.

Above all, the heating temperature is preferably a temperature for heating from the state of the step C, often 35° C. to 250° C., more often 50° C. to 150° C., still more often higher than 50° C. and 150° C. or lower, and particularly often 60° C. to 130° C.

The heating time is often 0.01 to 60 minutes and more often 0.03 to 5 minutes.

In addition, the absolute value of the weighted average helical twisting power of the chiral agent in the composition layer after light irradiation is not particularly limited, and the absolute value of the difference between the weighted average helical twisting power of the chiral agent in the composition layer after light irradiation and the weighted average helical twisting power of the chiral agent in the composition layer before light irradiation is preferably 0.05 $\mu m^{-1}$ or more, more preferably 0.05 to 10.0 $\mu m^{-1}$, and still more preferably 0.1 to 10.0 $\mu m^{-1}$.

(Step E)

The procedure of the step E is not particularly limited, and examples thereof include the above-mentioned curing treatment.

Figure 7:
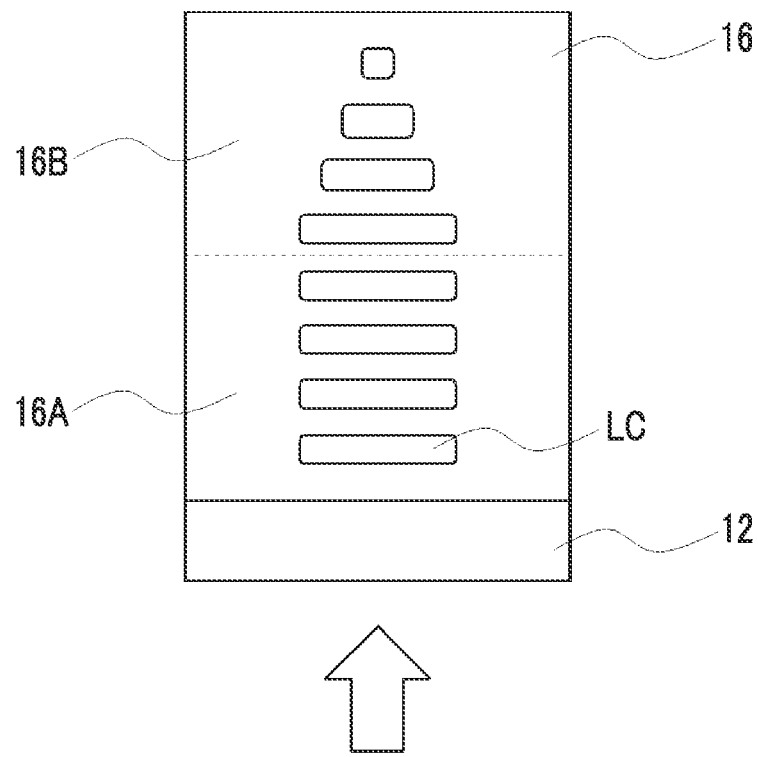
FIG. 7 is a cross-sectional view of a composition layer for explaining a case where a step E is carried out.

In a case where the composition layer shown in FIG. 7 is subjected to a curing treatment, the formed optically anisotropic layer includes two layers, a layer obtained by fixing the alignment state of the homogeneously aligned polymerizable liquid crystal compound from the resin substrate side, and a layer obtained by fixing the alignment state of the polymerizable liquid crystal compound twist-aligned along a helical axis extending along a thickness direction. That is, the formed optically anisotropic layer has a polylayer structure.

<Optical Film>

The obtained optical film can be applied to various applications, examples of which include an optical compensation film for optically compensating a liquid crystal cell, and an antireflection film used for a display device such as an organic electroluminescent display device.

<Circularly Polarizing Plate>

The above-mentioned optical film may be used as a circularly polarizing plate in combination with a polarizer.

The polarizer may be a member having a function of converting natural light into specific linearly polarized light, and examples thereof include an absorption type polarizer.

The type of the polarizer is not particularly limited, and a commonly used polarizer can be used. Examples of the polarizer include an iodine-based polarizer, a dye-based polarizer using a dichroic dye, and a polyene-based polarizer. The iodine-based polarizer and the dye-based polarizer are generally prepared by adsorbing iodine or a dichroic dye on a polyvinyl alcohol, followed by stretching.

A protective film may be arranged on one side or both sides of the polarizer.

The method for producing a circularly polarizing plate is not particularly limited, and a known method can be adopted.

For example, there is a method of bonding an optical film and a polarizer through an adhesive layer.

The circularly polarizing plate can be suitably applied as an antireflection for an organic EL display device.

EXAMPLES

Hereinafter, features of the present invention will be described more specifically with reference to Examples and Comparative Examples. The materials, amounts used, proportions, treatment details, treatment procedure, and the like shown in the following Examples can be appropriately changed without departing from the spirit and scope of the present invention. Accordingly, the scope of the present invention should not be construed as being limited by the specific examples given below.

Example 1

(Preparation of Cellulose Acylate Film (Substrate))

The following components are put into a mixing tank, stirred, heated at 90° C. for 10 minutes, and then filtered through a filter paper having an average pore diameter of 34 µm and a sintered metal filter having an average pore diameter of 10 µm to produce a cellulose acylate dope (hereinafter, also simply referred to as "dope"). The concentration of solid contents of the obtained dope was 23.5% by mass, and the mass ratio of the solvent was methylene chloride/methanol/butanol=81/18/1.

| Cellulose acylate dope | |
|---|---|
| Cellulose acylate (acetyl substitution degree: 2.86, viscosity average degree of polymerization: 310) | 100 parts by mass |
| Sugar ester compound 1 (shown in Chemical Formula (S4)) | 6.0 parts by mass |
| Sugar ester compound 2 (shown in Chemical Formula (S5)) | 2.0 parts by mass |
| Silica particle dispersion (AEROSIL R972, manufactured by Nippon Aerosil Co., Ltd.) | 0.1 parts by mass |
| Solvent (methylene chloride/methanol/butanol) | predetermined amount |

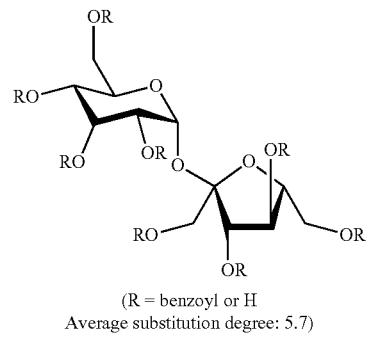

(R = benzoyl or H
Average substitution degree: 5.7)

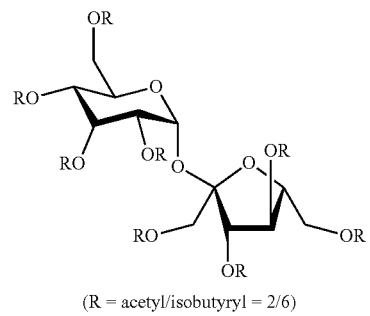

(R = acetyl/isobutyryl = 2/6)

The above-mentioned dope was cast using a drum film forming machine. The above-mentioned dope for forming a core layer so as to be in contact with a metal substrate cooled to 0° C. and the above-mentioned dope for forming a surface layer on the core layer were co-cast from a die, and then the obtained film was peeled off. The drum was made of Steel Use Stainless (SUS).

Using a tenter device that clips both ends of a film with clips to transport the film, the film peeled off from the drum was dried at 30° C. to 40° C. for 20 minutes during transport. Next, the obtained film was post-dried by zone heating while being rolled and transported. Then, the obtained film was knurled and then wound up.

The obtained long cellulose acylate film had a film thickness of 40 µm, an in-plane retardation Re (550) of 1 nm at a wavelength of 550 nm, a thickness direction retardation Rth (550) of 26 nm at a wavelength of 550 nm, and an SP value of 22 MPa$^{1/2}$.

(Formation of Optically Anisotropic Layer)

The cellulose acylate film prepared above was continuously subjected to a rubbing treatment. At this time, the longitudinal direction and the transport direction of the elongated film were parallel, and the angle between the film longitudinal direction (transport direction) and the rubbing roller rotation axis was 72°. The rotation axis of the rubbing roller was 18° in a case where the longitudinal direction (transport direction) of the film was defined as 90°, and the counterclockwise direction was represented by a positive value with reference to the width direction of the cellulose acylate film (0°), upon observing the film from the cellulose acylate film side. In other words, the position of the rotation axis of the rubbing roller was a position rotated by 72° clockwise with reference to the longitudinal direction of the cellulose acylate film.

A composition (A) for forming an optically anisotropic layer containing the following rod-like liquid crystal compound was applied onto the rubbing-treated film using a Geeser coating machine, and the film on which a composition layer was formed was heated at 100° C. for 80 seconds. Then, the composition layer was irradiated with light from a 365 nm LED lamp (manufactured by AcroEdge Co., Ltd.) at 40° C. under air (oxygen concentration: about 20% by volume) at an irradiation amount of 13 mJ/cm².

Further, the obtained composition layer was heated at 90° C. for 10 seconds

Then, the composition layer was irradiated (irradiation amount: 500 mJ/cm²) with light from a metal halide lamp (manufactured by Eye Graphics Co., Ltd.) at 55° C. in a nitrogen atmosphere to form an optically anisotropic layer 1 having a fixed alignment of the liquid crystal compound to prepare an optical film 1.

| Composition of composition (A) for forming optically anisotropic layer | |
|---|---|
| Rod-like liquid crystal compound (A) given below | 80 parts by mass |
| Rod-like liquid crystal compound (B) given below | 10 parts by mass |
| Rod-like liquid crystal compound (C) given below | 10 parts by mass |
| Ethylene oxide-modified trimethylolpropane triacrylate (V# 360, manufactured by Osaka Organic Chemical Industry Ltd.) | 4 parts by mass |
| Photopolymerization initiator (Irgacure 819, manufactured by BASF Japan Ltd.) | 3 parts by mass |
| Chiral agent (A) given below | 0.42 parts by mass |
| Chiral agent (B) given below | 0.38 parts by mass |
| Polymerizable polymer (b-1) given below | 0.5 parts by mass |
| Polymer (A) given below | 0.08 parts by mass |
| Methyl isobutyl ketone | 117 parts by mass |
| Ethyl propionate | 39 parts by mass |

Rod-Like Liquid Crystal Compound (A) (Hereinafter, Corresponding to a Mixture of Liquid Crystal Compounds)

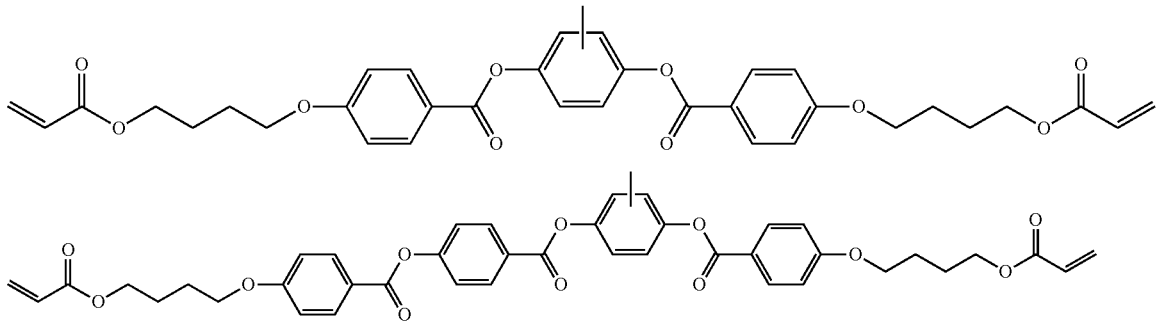

Rod-Like Liquid Crystal Compound (B)

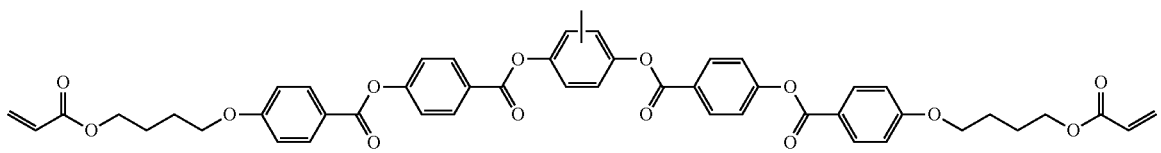

Rod-Like Liquid Crystal Compound (C)

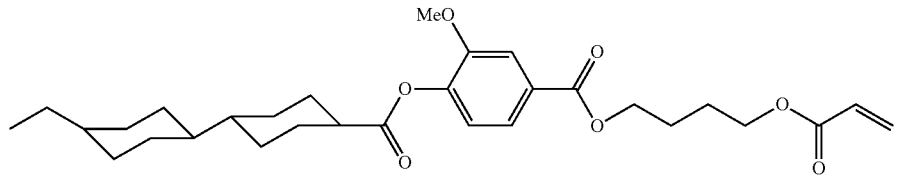 [SMILES: C=CC(=O)OCCCCOC(=O)c1ccc(OC(=O)C2CCC(C3CCC(CC)CC3)CC2)c(OC)c1]

Chiral agent (A)

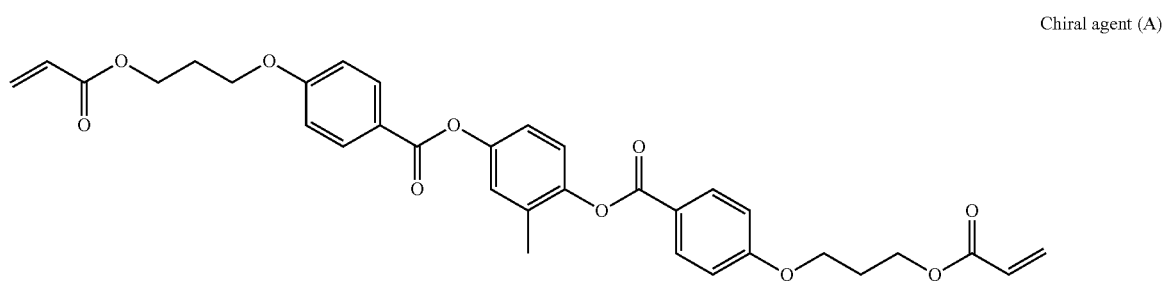

Chiral agent (B)

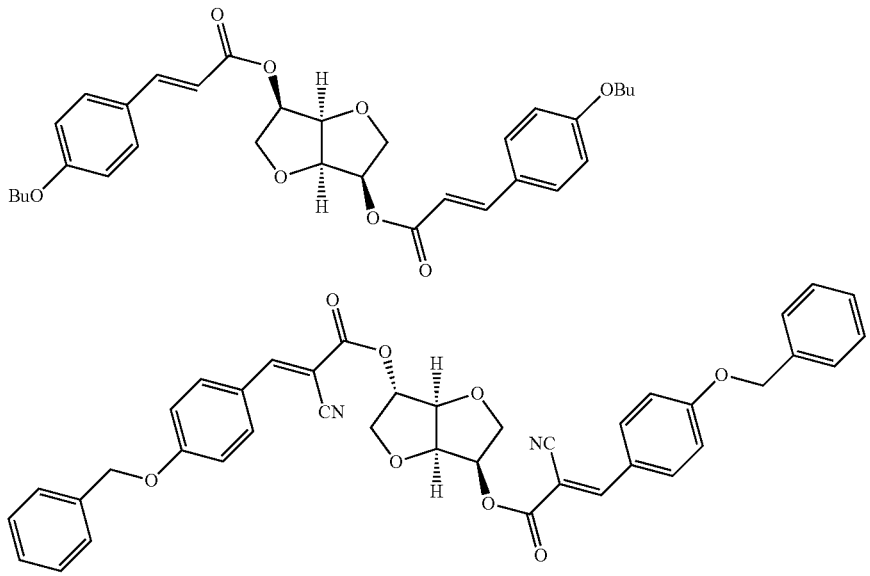

Polymerizable polymer (b-1) (SP value: 23.2 MPa$^{1/2}$) (In the formula, the numerical value described in each repeating unit represents the content (% by mass) of each repeating unit with respect to all the repeating units).

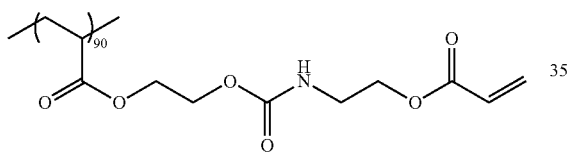

Polymer (A) (In the formula, the numerical value described in each repeating unit represents the content (% by mass) of each repeating unit with respect to all the repeating units).

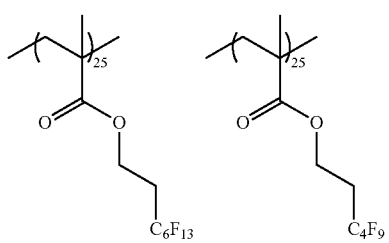

-continued

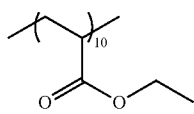

Example 2

An optical film 2 was prepared according to the same procedure as in Example 1, except that the polymer (b-1) was changed to a polymerizable polymer (b-2).

Polymerizable polymer (b-2) (SP value: 23.7 MPa$^{1/2}$) (In the formula, the numerical value described in each repeating unit represents the content (% by mass) of each repeating unit with respect to all the repeating units).

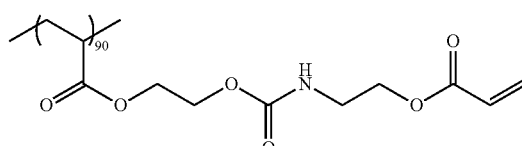

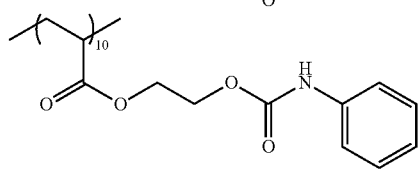

Example 3

An optical film 3 was prepared according to the same procedure as in Example 1, except that the polymer (b-1) was changed to a polymerizable polymer (b-3).

Polymerizable polymer (b-3) (SP value: 21.2 MPa$^{1/2}$) (In the formula, the numerical value described in each repeating unit represents the content (% by mass) of each repeating unit with respect to all the repeating units).

Example 4

An optical film 4 was prepared according to the same procedure as in Example 1, except that the cellulose acylate film was changed to a modified methyl methacrylate-based resin film (trade name "FINECAST FILM RZ-30NA-S" manufactured by Toyo Kohan Co., Ltd., SP value: 20.5 MPa$^{1/2}$).

Example 5

An optical film 5 was prepared according to the same procedure as in Example 1, except that the cellulose acylate film was changed to a thermoplastic norbornene-based resin film ("ZEONOR" manufactured by Zeon Corporation, SP value: 21 MPa$^{1/2}$).

Example 6

An optical film 6 was prepared according to the same procedure as in Example 1, except that the polymer (b-1) was changed to a boronic acid monomer (b-4).

Boronic acid monomer (b-4) (SP value: 24.1 MPa$^{1/2}$)

Comparative Example 1

An optical film C1 was prepared according to the same procedure as in Example 1, except that the polymer (b-1) in the composition of the composition (A) for forming an optically anisotropic layer was removed.

Comparative Example 2

An optical film C2 was prepared according to the same procedure as in Example 1, except that an acrylamide monomer (b-5) was used instead of the polymer (b-1).

Acrylamide monomer (b-5) (SP value: 24.8 MPa$^{1/2}$)

Comparative Example 3

An optical film C3 was prepared according to the same procedure as in Example 1, except that the amount of the polymer (X1) added in the composition of the composition (A) for forming an optically anisotropic layer was changed to 11 parts by mass.

<Evaluation>

(Aligning Properties)

The optically anisotropic layer in the obtained optical film was observed with a polarization microscope in a crossed nicols state and evaluated according to the following standards.

"A": No optical defects are observed.
"B": Slight optical defects are observed, but there is no problem in practical use.
"C": Many optical defects are observed, and there is a problem in practical use.

(Measuring Method of TOF-SIMS)

Equipment and Conditions

Equipment: TOF-SIMSV (manufactured by IONTOF GmbH)

Depth direction analysis: Combined with Ar ion sputtering

Measurement range: Raster scan of 128 points each in one direction and in a direction orthogonal thereto.

Polarity: positive, negative

Imax, Iave, and Iwid were calculated according to the methods described above. In addition, it was confirmed whether or not the requirement 1 and the requirement 2 were satisfied according to the above-mentioned procedure.

(Cross Cut Test)

A cross cut test (a grid tape peeling test) according to JIS D0202-1988 was carried out on the optically anisotropic layer of the obtained optical film. Of the 100 squares formed by cutting in a lattice form on the optically anisotropic layer, the number of squares peeled off by attaching and peeling a cellophane tape ("CT24", manufactured by Nichiban Co., Ltd.) was counted and evaluated according to the following standards.

"S": The number of squares to be peeled off is zero
"A": The number of squares to be peeled off is 1 to 30
"B": The number of squares to be peeled off is 31 to 50°
"C": The number of squares to be peeled off is 51 or more In the column of "Requirement 1" in Table 2, a case where the requirement 1 is satisfied is defined as "A", and a case where the requirement 1 is not satisfied is defined as "B".

TABLE 2

| | Configuration | | | | Evaluation result | | | |
|---|---|---|---|---|---|---|---|---|
| | | Compound (b) | | | | | | |
| | Resin substrate | Compound designation | Amount added (parts by mass) | Aligning properties | Cross cut test | Requirement 1 | Imax/Iave | Iwid |
| Example 1 | Cellulose acylate film | (b-1) | 0.5 | A | S | A | 200 | 10 |
| Example 2 | Cellulose acylate film | (b-2) | 0.5 | A | S | A | 200 | 10 |
| Example 3 | Cellulose acylate film | (b-3) | 0.5 | A | A | A | 1.3 | 10 |
| Example 4 | Modified methyl methacrylate-based resin film | (b-1) | 0.5 | B | S | A | 200 | 10 |
| Example 5 | Thermoplastic norbornene-based resin film | (b-1) | 0.5 | B | S | A | 200 | 10 |
| Example 6 | Cellulose acylate film | (b-4) | 3 | A | B | A | 1.3 | 100 |
| Comparative Example 1 | Cellulose acylate film | — | — | A | C | B | — | — |
| Comparative Example 2 | Cellulose acylate film | (b-5) | 3 | A | C | B | 1 | — |
| Comparative Example 3 | Cellulose acylate film | (b-1) | 11 | C | S | A | 200 | 125 |

As shown in the above table, it was confirmed that the optical film according to embodiment of the present invention exhibited a desired effect.

From the comparison of Examples 1, 4 and 5, it was confirmed that the effect was more excellent in a case where the cellulose acylate film was used as the resin substrate.

From the comparison of Examples 1 to 3 and 6, it was confirmed that the effect was more excellent in a case where the specific polymerizable polymer was used as the specific compound.

From the comparison of Examples 1 to 3, it was confirmed that the effect was more excellent in a case where Imax/Iave was 50 or more.

EXPLANATION OF REFERENCES

10: optical film
12: resin substrate
14: optically anisotropic layer
16: composition layer

What is claimed is:

1. An optical film comprising:
a resin substrate having an alignment regulating force; and
an optically anisotropic layer arranged on the resin substrate,
wherein the optically anisotropic layer contains a liquid crystal compound and a compound having a heteroatom different from the liquid crystal compound, and
in a case where a surface of the optical film on an optically anisotropic layer side thereof is defined as a first surface and a surface of the optical film on a resin substrate side thereof is defined as a second surface, and components of the optical film in a depth direction are analyzed by time-of-flight secondary ion mass spectrometry while irradiating the optical film with an ion beam from the first surface toward the second surface, the optical film satisfies both the following Requirement 1 and Requirement 2,
Requirement 1: the optical film exhibits a maximum value Imax of a secondary ionic intensity derived from the compound having a heteroatom at any depth position between an A position and a B position, in a case where a depth position located closest to the second surface showing a secondary ion intensity, which is 80% of a maximum intensity of a secondary ion intensity derived from the liquid crystal compound, is defined as the A position, and a depth position located closest to the first surface showing a secondary ion intensity, which is 80% of a maximum intensity of a secondary ion intensity derived from a resin constituting the resin substrate, is defined as the B position, and
Requirement 2: a distance between a C position and a D position is 100 nm or less, in a case where a depth position which shows a maximum value Imax of a secondary ion intensity derived from the compound having a heteroatom is defined as a peak position, a depth position which shows a secondary ion intensity that is half of the maximum value Imax, is closer to the first surface side than the peak position, and is closest to the peak position is defined as the C position, and a depth position which shows a secondary ion intensity that is half of the maximum value Imax, is closer to the second surface side than the peak position, and is closest to the peak position is defined as the D position.

2. The optical film according to claim 1,
wherein the compound having a heteroatom has at least one selected from the group consisting of a urethane group, an ester group, an amide group, and a boronic acid group.

3. The optical film according to claim 1,
wherein the optically anisotropic layer is
a layer formed of a composition containing a liquid crystal compound having a polymerizable group and
a polymerizable compound having a heteroatom and having a polymerizable group, which is different from the liquid crystal compound having a polymerizable group.

4. The optical film according to claim 3,
wherein the polymerizable compound having a heteroatom and having a polymerizable group is a polymer that contains a repeating unit having a polymerizable group and has a heteroatom.

5. The optical film according to claim 1,
wherein the maximum value Imax and an average value Iave satisfy a relationship of Expression (A) in a case where an average intensity of a secondary ion intensity derived from the compound having a heteroatom from the first surface to the A position is defined as the average value Iave $$1.3 \leq Imax/Iave. \quad \text{Expression (A)}$$

6. The optical film according to claim 5,
wherein the Imax/Iave is 50 or more.

7. The optical film according to claim 1,
wherein a distance between the C position and the D position is 50 nm or less.

8. The optical film according to claim 1,
wherein the resin substrate contains cellulose acylate.

9. The optical film according to claim 2,
wherein the optically anisotropic layer is
a layer formed of a composition containing a liquid crystal compound having a polymerizable group and
a polymerizable compound having a heteroatom and having a polymerizable group, which is different from the liquid crystal compound having a polymerizable group.

10. The optical film according to claim 9,
wherein the polymerizable compound having a heteroatom and having a polymerizable group is a polymer that contains a repeating unit having a polymerizable group and has a heteroatom.

11. The optical film according to claim 2,
wherein the maximum value Imax and an average value Iave satisfy a relationship of Expression (A) in a case where an average intensity of a secondary ion intensity derived from the compound having a heteroatom from the first surface to the A position is defined as the average value Iave $$1.3 \leq Imax/Iave. \quad \text{Expression (A)}$$

12. The optical film according to claim 11,
wherein the Imax/Iave is 50 or more.

13. The optical film according to claim 2,
wherein a distance between the C position and the D position is 50 nm or less.

14. The optical film according to claim 2,
wherein the resin substrate contains cellulose acylate.

15. The optical film according to claim 3,
wherein the maximum value Imax and an average value Iave satisfy a relationship of Expression (A) in a case where an average intensity of a secondary ion intensity derived from the compound having a heteroatom from the first surface to the A position is defined as the average value Iave $$1.3 \leq Imax/Iave \quad \text{Expression (A)}$$

16. The optical film according to claim 15,
wherein the Imax/Iave is 50 or more.

17. The optical film according to claim 3,
wherein a distance between the C position and the D position is 50 nm or less.

18. The optical film according to claim 3,
wherein the resin substrate contains cellulose acylate.

19. The optical film according to claim 4,
wherein the maximum value Imax and an average value Iave satisfy a relationship of Expression (A) in a case where an average intensity of a secondary ion intensity derived from the compound having a heteroatom from the first surface to the A position is defined as the average value Iave $$1.3 \leq Imax/Iave. \quad \text{Expression (A)}$$

20. The optical film according to claim 19,
wherein the Imax/Iave is 50 or more.

* * * * *